(12) United States Patent
Tsao

(10) Patent No.: US 7,964,981 B2
(45) Date of Patent: Jun. 21, 2011

(54) SOLAR AND WIND ENERGY CONVERTER

(75) Inventor: Jason Tsao, Torrance, CA (US)

(73) Assignee: Jason Tsao, Torrance, CA (US)

( * ) Notice: Subject to any disclaimer, the term of this patent is extended or adjusted under 35 U.S.C. 154(b) by 0 days.

(21) Appl. No.: 12/965,404

(22) Filed: Dec. 10, 2010

(65) Prior Publication Data

US 2011/0080007 A1    Apr. 7, 2011

Related U.S. Application Data

(63) Continuation of application No. 12/539,426, filed on Aug. 11, 2009, now Pat. No. 7,851,935.

(51) Int. Cl.
*F03D 9/00* (2006.01)
*H02P 9/04* (2006.01)

(52) U.S. Cl. ................. 290/44; 290/55; 60/698

(58) Field of Classification Search ........... 290/44, 290/55; 60/698
See application file for complete search history.

(56) References Cited

U.S. PATENT DOCUMENTS

| | | | | | |
|---|---|---|---|---|---|
| 996,334 | A | * | 6/1911 | Haskins | 290/4 C |
| 3,509,719 | A | * | 5/1970 | Kelly | 60/523 |
| 3,970,409 | A | * | 7/1976 | Luchuk | 416/145 |
| 3,994,136 | A |   | 11/1976 | Polster | 60/518 |
| 3,995,429 | A | * | 12/1976 | Peters | 60/641.8 |
| 4,031,405 | A | * | 6/1977 | Asperger | 290/55 |
| 4,044,558 | A |   | 8/1977 | Benson | 60/520 |
| 4,068,474 | A | * | 1/1978 | Dimitroff | 60/641.15 |
| 4,069,674 | A | * | 1/1978 | Warren | 60/641.8 |
| 4,118,636 | A | * | 10/1978 | Christian | 290/52 |
| 4,119,863 | A | * | 10/1978 | Kelly | 290/55 |
| 4,122,675 | A | * | 10/1978 | Polyak | 327/28 |
| 4,164,123 | A | * | 8/1979 | Smith | 60/641.11 |
| 4,213,303 | A | * | 7/1980 | Lane | 60/641.15 |
| 4,229,941 | A |   | 10/1980 | Hope | 60/641 |
| 4,253,303 | A | * | 3/1981 | Liljequist | 60/517 |
| 4,278,896 | A |   | 7/1981 | McFarland | 290/55 |

(Continued)

FOREIGN PATENT DOCUMENTS

GB    2168763 A  *  6/1986

(Continued)

OTHER PUBLICATIONS

Pyper, W. "A Stirling Idea" ECOS, pp. 28-30 (2005).

(Continued)

*Primary Examiner* — Pedro J Cuevas
(74) *Attorney, Agent, or Firm* — Occhiuti Rohlicek & Tsao LLP

(57) ABSTRACT

A system for converting wind and solar energy for use with an electrical generator, the system includes a wind powered subsystem including: a rotor for receiving wind to generate mechanical energy; and a first shaft for providing a permanent mechanical coupling between the rotor and the electrical generator for transferring the generated mechanical energy to the electrical generator; a solar powered subsystem including: a solar collector for receiving solar energy to generate thermal energy; a thermo-mechanical engine coupled to the solar collector for converting the generated thermal energy into mechanical energy; and a second shaft mechanically coupled to the thermo-mechanical engine; and an interconnection subsystem for selecting between coupling the second shaft to the first shaft for combining the mechanical energy generated by the wind and solar powered subsystems to be transferred to the electrical generator, and decoupling the second shaft from the first shaft.

22 Claims, 27 Drawing Sheets

U.S. PATENT DOCUMENTS

| | | | | |
|---|---|---|---|---|
| 4,319,141 | A | 3/1982 | Schmugge | 290/52 |
| 4,392,351 | A * | 7/1983 | Doundoulakis | 60/526 |
| 4,395,880 | A | 8/1983 | Berchowitz | 60/518 |
| 4,433,544 | A * | 2/1984 | Wells et al. | 60/641.12 |
| 4,462,213 | A * | 7/1984 | Lewis | 60/641.8 |
| 4,586,334 | A * | 5/1986 | Nilsson et al. | 60/524 |
| 4,642,988 | A * | 2/1987 | Benson | 60/641.14 |
| 4,707,990 | A * | 11/1987 | Meijer | 60/641.15 |
| 4,745,749 | A * | 5/1988 | Benson | 60/518 |
| 4,779,006 | A * | 10/1988 | Wortham | 290/55 |
| 4,894,989 | A * | 1/1990 | Mizuno et al. | 60/517 |
| 4,911,144 | A * | 3/1990 | Godett et al. | 126/636 |
| 4,945,731 | A * | 8/1990 | Parker et al. | 60/641.15 |
| 5,075,564 | A * | 12/1991 | Hickey | 290/55 |
| 5,103,646 | A | 4/1992 | Fini | 60/698 |
| 5,113,659 | A * | 5/1992 | Baker et al. | 60/641.8 |
| 5,254,876 | A * | 10/1993 | Hickey | 290/55 |
| 5,417,052 | A * | 5/1995 | Bharathan et al. | 60/783 |
| 5,444,972 | A * | 8/1995 | Moore | 60/39.182 |
| 5,694,774 | A * | 12/1997 | Drucker | 60/641.11 |
| 5,727,379 | A * | 3/1998 | Cohn | 60/39.182 |
| 5,755,100 | A * | 5/1998 | Lamos | 60/521 |
| 5,806,317 | A * | 9/1998 | Kohler et al. | 60/659 |
| 5,857,322 | A * | 1/1999 | Cohn | 60/39.182 |
| 5,918,463 | A * | 7/1999 | Penswick et al. | 60/517 |
| 5,983,634 | A * | 11/1999 | Drucker | 60/398 |
| 6,016,015 | A * | 1/2000 | Willard, Jr. | 290/55 |
| 6,097,104 | A | 8/2000 | Russell | 290/54 |
| 6,372,978 | B1 * | 4/2002 | Cifaldi | 136/248 |
| 6,661,113 | B1 * | 12/2003 | Bonin | 290/55 |
| 6,984,899 | B1 | 1/2006 | Rice | 290/44 |
| 7,042,109 | B2 * | 5/2006 | Gabrys | 290/44 |
| 7,045,702 | B2 * | 5/2006 | Kashyap | 136/244 |
| 7,076,941 | B1 * | 7/2006 | Hoffman et al. | 60/643 |
| 7,134,279 | B2 | 11/2006 | White et al. | 60/517 |
| 7,171,811 | B1 | 2/2007 | Berchowitz et al. | 60/525 |
| 7,172,386 | B2 * | 2/2007 | Truong et al. | 415/4.1 |
| 7,438,533 | B2 | 10/2008 | Eyb et al. | 416/230 |
| 7,453,167 | B2 | 11/2008 | Gilbert | 290/55 |
| 7,484,366 | B2 | 2/2009 | Mori | 60/517 |
| 7,488,150 | B2 | 2/2009 | Krippene | 415/4.2 |
| D595,885 | S * | 7/2009 | Daidone et al. | D26/69 |
| 7,573,168 | B2 * | 8/2009 | Carl et al. | 310/156.08 |
| 7,633,176 | B1 * | 12/2009 | Blittersdorf | 290/44 |
| 7,640,746 | B2 * | 1/2010 | Skowronski et al. | 60/641.8 |
| D610,732 | S * | 2/2010 | Daidone et al. | D26/71 |
| 7,736,125 | B2 * | 6/2010 | Bagepalli et al. | 415/126 |
| 7,808,127 | B2 * | 10/2010 | Teggatz et al. | 307/84 |
| 7,821,151 | B2 * | 10/2010 | Le et al. | 290/55 |
| D626,686 | S * | 11/2010 | Daidone et al. | D26/155 |
| 7,845,172 | B2 * | 12/2010 | Goldman | 60/641.8 |
| 7,851,935 | B2 * | 12/2010 | Tsao | 290/44 |
| 2004/0041409 | A1 | 3/2004 | Gabrys | 290/55 |
| 2004/0150272 | A1 | 8/2004 | Gordon et al. | 310/67 A |
| 2006/0055175 | A1 * | 3/2006 | Grinblat | 290/54 |
| 2006/0066110 | A1 * | 3/2006 | Jansen et al. | 290/44 |
| 2006/0071575 | A1 * | 4/2006 | Jansen et al. | 310/266 |
| 2006/0266039 | A1 * | 11/2006 | Skowronski et al. | 60/641.8 |
| 2007/0075548 | A1 * | 4/2007 | Bagepalli et al. | 290/55 |
| 2007/0090711 | A1 * | 4/2007 | Carl et al. | 310/156.48 |
| 2007/0095064 | A1 * | 5/2007 | Hoffman et al. | 60/620 |
| 2007/0204611 | A1 * | 9/2007 | Sawada et al. | 60/520 |
| 2007/0227144 | A1 * | 10/2007 | Yaguchi et al. | 60/616 |
| 2008/0034757 | A1 * | 2/2008 | Skowronski et al. | 60/641.8 |
| 2008/0078175 | A1 * | 4/2008 | Roychoudhury et al. | 60/517 |
| 2008/0131830 | A1 * | 6/2008 | Nix | 432/220 |
| 2008/0163620 | A1 * | 7/2008 | Yaguchi et al. | 60/517 |
| 2008/0197633 | A1 * | 8/2008 | Laskaris et al. | 290/44 |
| 2008/0250788 | A1 * | 10/2008 | Nuel et al. | 60/641.14 |
| 2008/0292467 | A1 * | 11/2008 | Borgen | 416/244 R |
| 2009/0015020 | A1 * | 1/2009 | Stiesdal | 290/55 |
| 2009/0134627 | A1 * | 5/2009 | Stiesdal | 290/55 |
| 2009/0134628 | A1 * | 5/2009 | Stiesdal | 290/55 |
| 2009/0134629 | A1 * | 5/2009 | Stiesdal | 290/55 |
| 2009/0134630 | A1 * | 5/2009 | Stiesdal | 290/55 |
| 2009/0212570 | A1 * | 8/2009 | Le et al. | 290/52 |
| 2009/0224550 | A1 * | 9/2009 | Bray et al. | 290/55 |
| 2009/0256431 | A1 * | 10/2009 | Stiesdal | 310/45 |
| 2009/0256442 | A1 * | 10/2009 | Stiesdal | 310/90 |
| 2009/0267347 | A1 * | 10/2009 | Abatemarco | 290/43 |
| 2009/0315330 | A1 * | 12/2009 | Dederick | 290/53 |
| 2010/0026100 | A1 * | 2/2010 | Teggatz et al. | 307/82 |
| 2010/0045047 | A1 * | 2/2010 | Stiesdal | 290/55 |
| 2010/0066096 | A1 * | 3/2010 | Stiesdal | 290/55 |
| 2010/0066195 | A1 * | 3/2010 | Stiesdal | 310/198 |
| 2010/0066196 | A1 * | 3/2010 | Stiesdal | 310/198 |
| 2010/0072854 | A1 * | 3/2010 | Stiesdal | 310/216.113 |
| 2010/0107633 | A1 * | 5/2010 | Tsao | 60/641.8 |
| 2010/0117372 | A1 * | 5/2010 | McMaster | 290/55 |
| 2010/0133820 | A1 * | 6/2010 | Tsao | 290/44 |
| 2010/0170293 | A1 * | 7/2010 | Tsarev et al. | 62/476 |
| 2010/0207453 | A1 * | 8/2010 | Ottman | 307/72 |
| 2010/0225266 | A1 * | 9/2010 | Hartman | 320/101 |
| 2011/0025058 | A1 * | 2/2011 | Nies | 290/44 |
| 2011/0031761 | A1 * | 2/2011 | DeAngeles | 290/55 |
| 2011/0061383 | A1 * | 3/2011 | McAlister | 60/641.7 |

FOREIGN PATENT DOCUMENTS

| | | |
|---|---|---|
| JP | 09-280664 | 10/1997 |
| JP | 11-237138 | 8/1999 |
| JP | 3018550 | 1/2000 |
| KR | 10-2002-0061356 | 7/2002 |
| KR | 10-0810990 | 3/2008 |
| WO | WO 2009035363 A1 * | 3/2009 |

OTHER PUBLICATIONS

Minassians, A. "Stirling Engines for Low-Temperature Solar-Thermal-Electric Power Generation" http://www.eecs.berkeley.edu/Pubs/TechRpts/2007/EEFCS-2007-172.html (2007).

* cited by examiner

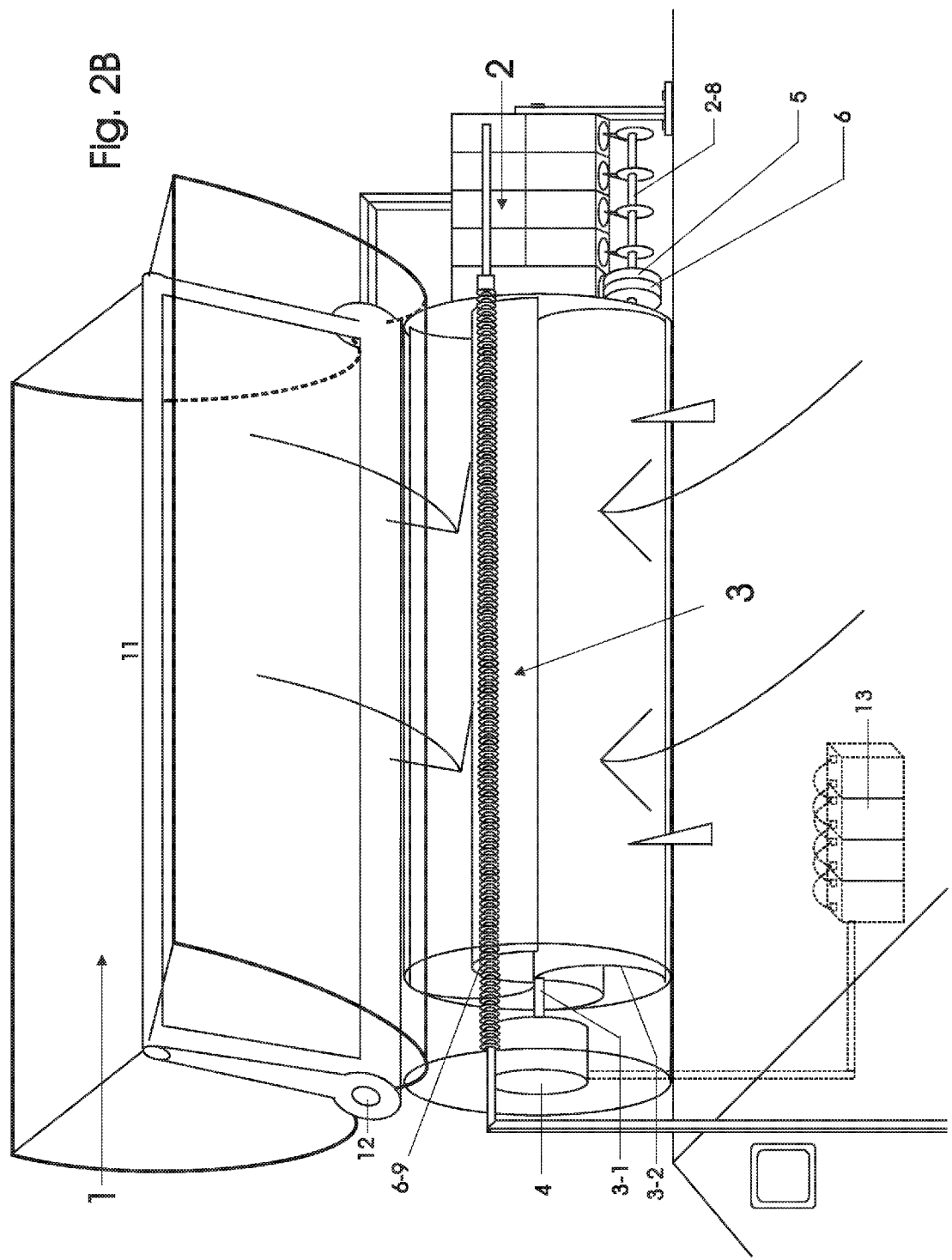

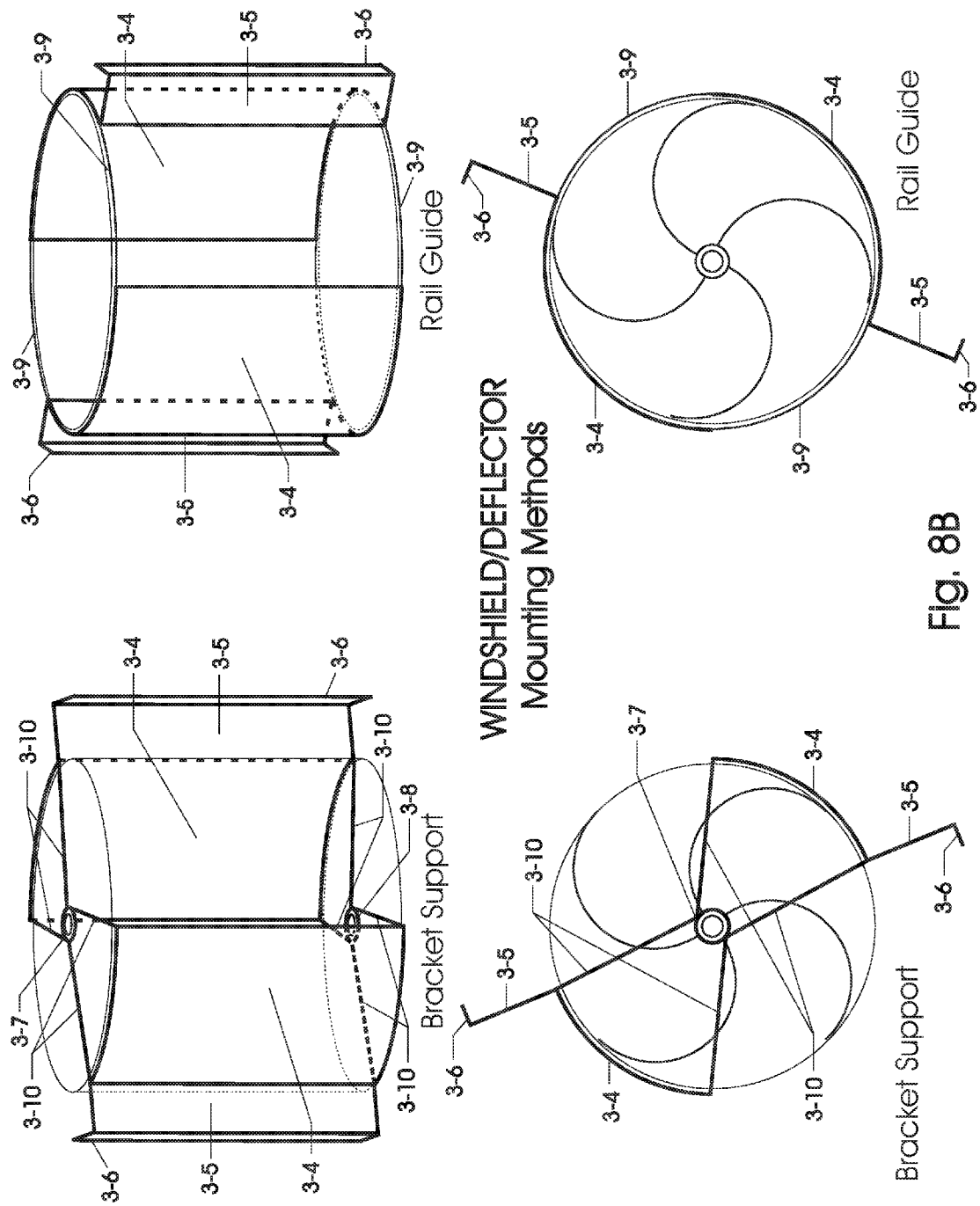
Fig. 8B WINDSHIELD/DEFLECTOR Mounting Methods

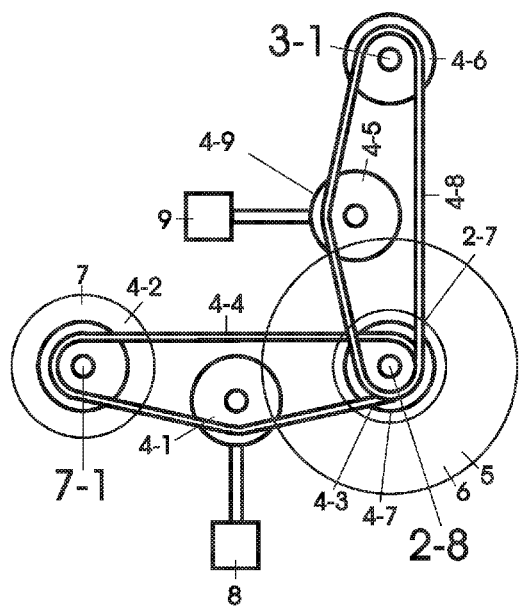
Fig. 13A
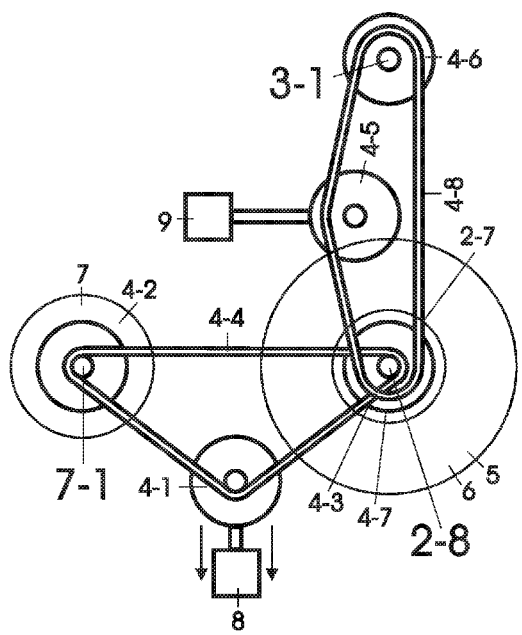
Fig. 13B
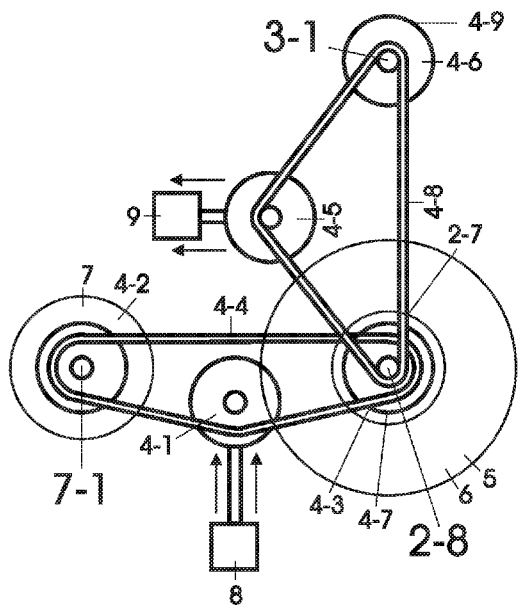
Fig. 13C
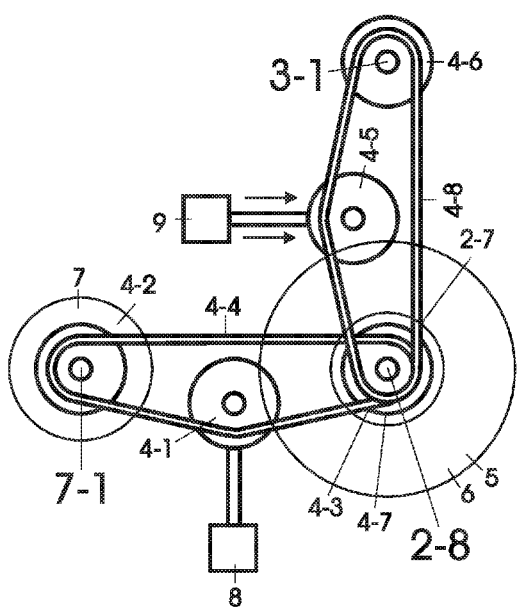
Fig. 13D → Fig. 13A

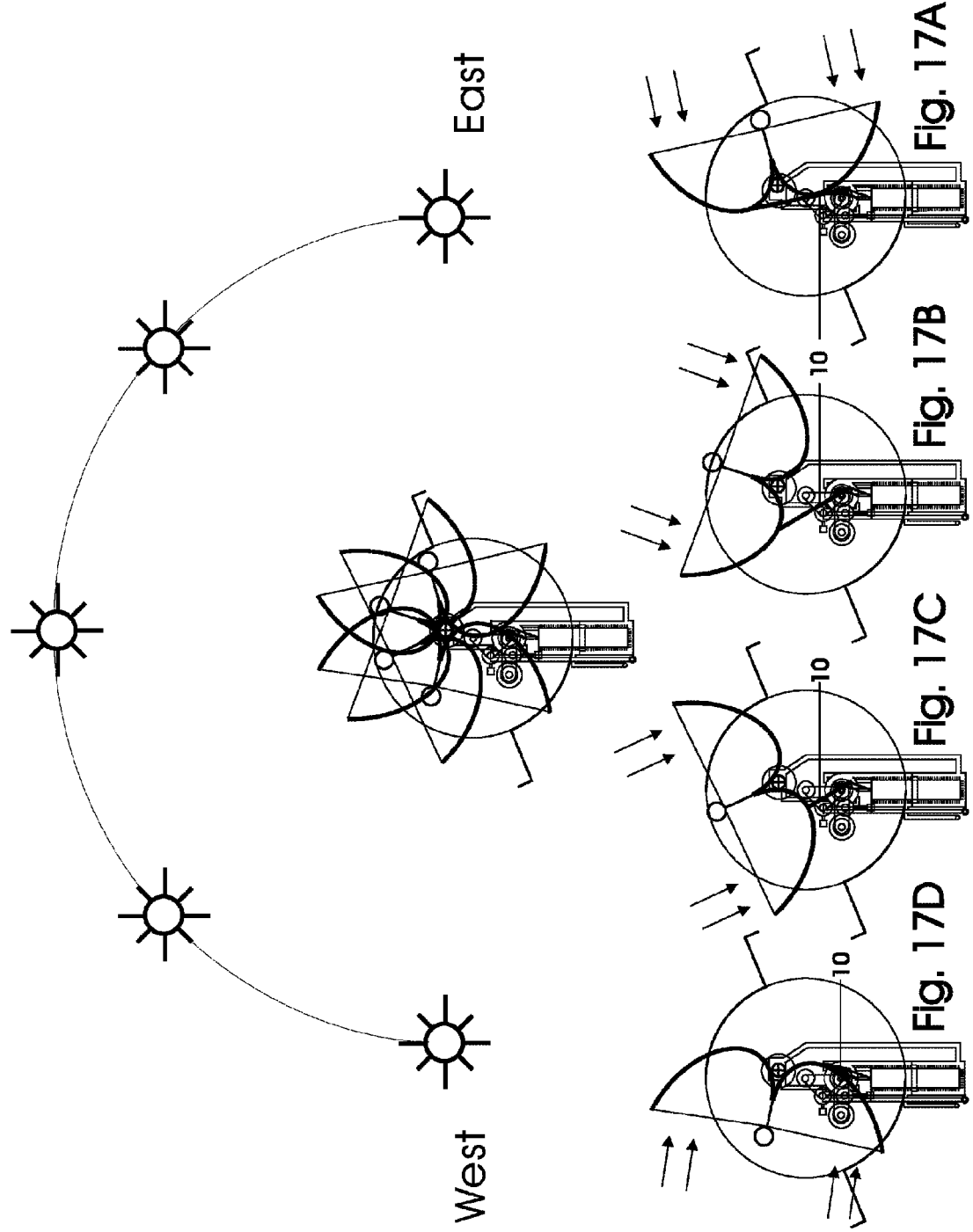

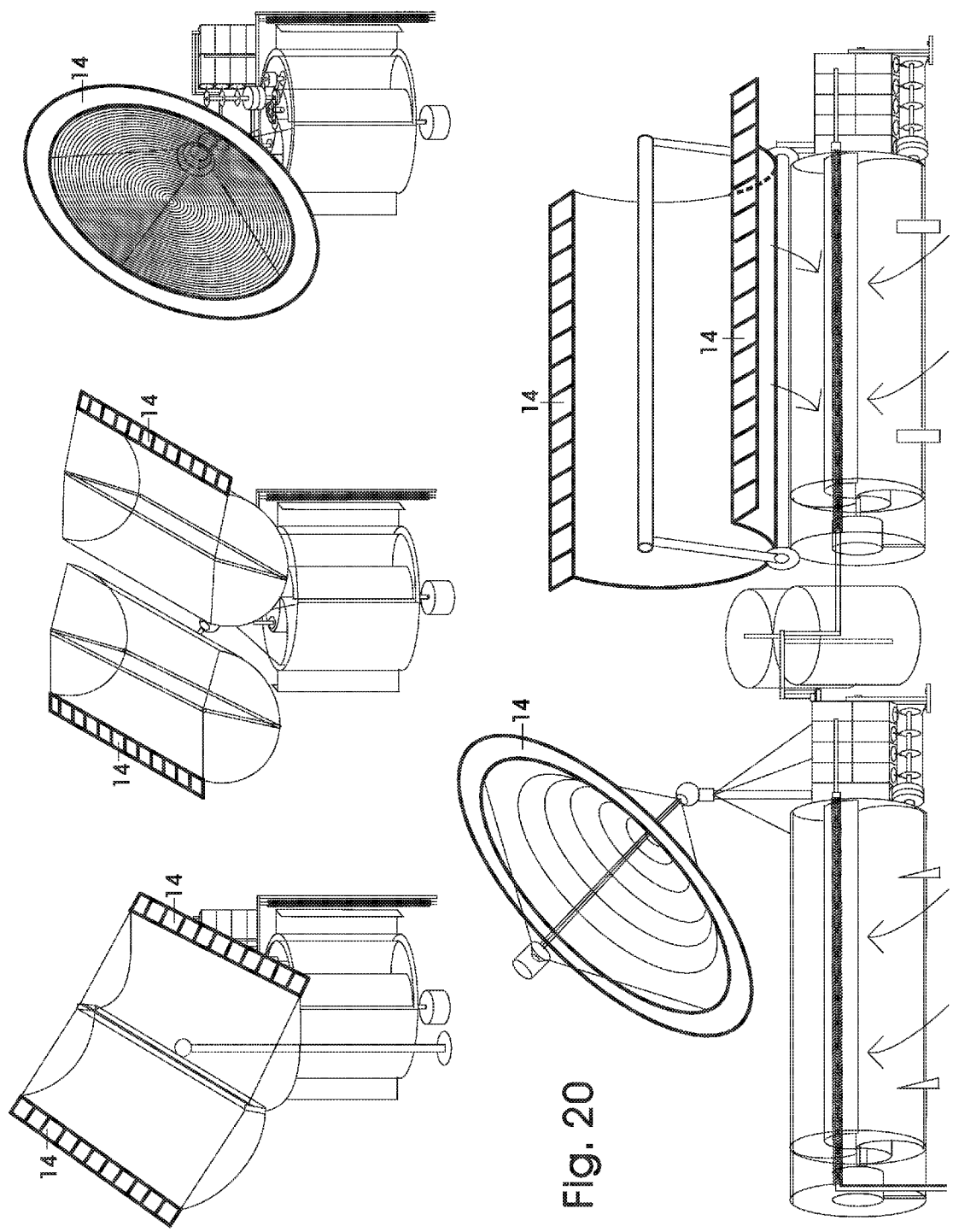

SOLAR AND WIND ENERGY CONVERTER

CROSS-REFERENCE TO RELATED APPLICATION PARAGRAPH

This application is a continuation of U.S. Ser. No. 12/539,426, filed on Aug. 11, 2009, the content of which is hereby incorporated by reference in its entirety.

BACKGROUND

This application relates to solar and wind energy converters.

Wind energy can be converted into useful forms such as electricity. It has emerged as the fastest growing source of energy, presenting a clean, renewable, and ecology-friendly alternative to traditional fossil-based energy supplies. However, due to seasonal and daily variations in wind speed, the output of a wind energy converter often fluctuates.

Solar energy is another type of clean energy source that can be converted to produce electricity. Yet, the output of a solar power converter also relies heavily on weather conditions. For instance, many solar panels are designed to only convert solar energy during sunny daylight hours. They do not produce significant amount of energy during cloudy days or nighttime.

SUMMARY

Some general aspects of the invention relate to systems and methods for providing an integrated and complementary energy generating system capable of converting wind and solar energy for use with an electrical generator. During the daytime, such hybrid systems concurrently derive energy from both wind and solar energy sources. During the nighttime, the systems can continuously harvest wind energy regardless of the weather condition. As the peak of wind flow and sunlight tends to occur at different times of the day and year (for instance, winds are stronger in the winter with less sunlight and also stronger during nighttime), these two energy sources can complement each other. A hybrid system that utilizes both sources can reduce the fluctuation in the combined energy output and produce more power in the daytime for urban and suburban areas when electricity demand is usually higher.

One system, for instance, includes a wind powered subsystem having a rotor for receiving wind to generate mechanical energy, and a first shaft mechanically coupled between the rotor and the electrical generator for transferring the generated mechanical energy to the electrical generator. The system also includes a solar powered subsystem having a solar collector for receiving solar energy to generate thermal energy, a thermo-mechanical engine coupled to the solar collector for converting the generated thermal energy into mechanical energy, and a second shaft mechanically coupled to the thermo-mechanical engine. An interconnection subsystem is provided for disengageably coupling the second shaft to the first shaft for combining the mechanical energy generated by the wind and solar powered subsystems to be transferred to the electrical generator.

Embodiments of these aspects may include one or more of the following features.

The thermo-mechanical engine of the solar powered subsystem can be an external combustion engine, for instance, having a set of one or more Stirling engines. Each engine may include a hot zone and a cold zone. A close loop circulation system is provided for circulating a heat transfer fluid through the hot zone of the thermo-mechanical engine. In some examples, the close loop circulation system includes a fluid reservoir for storing the heat transfer fluid, a rotary pump for pumping the heat transfer fluid contained in the fluid reservoir through a first conduit toward a heat source to be heated and subsequently through a second conduit toward the hot zone of the thermo-mechanical engine. In some examples, a second circulation system is provided for circulating a cooling agent to maintain a low temperature of the cold zone of the thermo-mechanical engine.

The solar collector may include an array of one or more collectors such as parabolic reflectors, parabolic troughs, compound parabolic collectors (CPCs), evacuated solar tubes, and Fresnel lens concentrators, some of which are configured for concentrating sunrays on an absorber to heat the heat transfer fluid circulated in the thermo-mechanical engine. The heated heat transfer fluid is circulated to the hot zone of the thermo-mechanical engine for converting thermal energy to mechanical energy. This mechanical energy is transferred to the electric generator through the coupling between the first shaft and the second shaft.

In some embodiments, the wind powered subsystem further includes a wind shield structure rotatably mounted to the first shaft. The wind shield structure may include a pair of arc-cylindrical members symmetrically positioned outside the periphery of the rotor. It may further include a pair of deflectors each angle-mounted at the outer edge of a corresponding arc-cylindrical member for directing wind flow toward a desired region of the rotor. Each deflector may also have a bend on its outside edge and the bend points to an opposite direction.

One embodiment of the interconnection subsystem includes a set of pulleys and one or more V-belts for selectively coupling the set of pulleys. An electric motor is configured for moving a selected one of the set of pulleys upon activation by a control signal, thereby tightening the V-belts over the set of pulleys to couple the second shaft to the first shaft. The interconnection subsystem may further include a control module for generating the control signal for activating the electrical motor in response to environmental conditions, for instance, wind condition, sun condition, and temperature condition in the thermo-mechanical engine and in the solar absorber. In some examples, the control module includes temperature sensors for detecting the temperature of a heat transfer fluid inside the thermo-mechanical engine and in the solar absorber.

In some embodiments, the solar powered subsystem further includes a sun tracking component for obtaining measurements of the sun rays and for directing the solar collector to a desired orientation relative to the sun rays based on the obtained measurements.

The wind powered subsystem may include a vertical-axis turbine or a horizontal-axis turbine.

The solar powered subsystem may further include a set of one or more solar panels coupled to the solar collector for generating additional electricity to power one or more power consumption devices in the wind or the solar powered subsystem.

Another aspect of the invention relates to methods for operating a hybrid energy system having a wind powered subsystem and a solar powered subsystem coupled to an electrical generator. The wind powered subsystem has a first shaft for transferring mechanical energy generated by the wind powered subsystem to the electrical generator, and the solar powered subsystem has a second shaft for transferring mechanical energy generated by the solar powered subsystem. The method includes obtaining measurements characterizing an environmental condition (e.g., a wind condition or a sun condition), and determining whether an activation condition is satisfied according to the obtained measurements. Upon satisfaction of the activation condition, the second shaft is engaged to the first shaft for combining the mechanical energy generated by the solar powered subsystem with the mechanical energy generated by the wind powered subsystem, and for transferring the combined mechanical energy to the electrical generator. The method also includes determining whether a deactivation condition is satisfied according to the obtained measurements. Upon satisfaction of the deactivation condition, the second shaft is disengaged from the first shaft to stop transfer of the mechanical energy generated by the solar power system to the electrical generator.

In some embodiments, the method further includes determining whether a starting condition is satisfied according to the obtained measurements, and if so, mechanically coupling the second shaft to a motor for initiating a rotational movement of the second shaft.

In some embodiments of solar powered subsystem that include a thermo-mechanical engine, a heat transfer fluid is used. In some of these cases, obtaining measurements characterizing an environmental condition includes obtaining measurements of a temperature condition of the heat transfer fluid in the thermo-mechanical engine and in the solar absorber. In some examples, the activation condition is associated with a first threshold temperature, and the deactivation condition is associated with a second threshold temperature.

Another general aspect of the invention relates to a wind powered system having a power generating turbine having a shaft and a set of two or more blades rotatably coupled to the shaft, and a wind shield structure rotatably mounted to the shaft for directing wind toward a desired region of the power generating turbine. The wind shield structure includes a pair of arc-cylindrical members opposingly positioned at the same radial distance from a longitudal axis of the shaft for partially enclosing the set of two or more blades, and a pair of deflectors with a bend on the outside edge and each bend points to an opposite direction. Each deflector is mounted at a desired angle to an end of a corresponding arc-cylindrical member and being opposingly positioned with respect to the longitudal axis of the shaft in order to settle the wind shield structure under the wind at a position that improves an efficiency of energy conversion.

Embodiments of various aspects of the invention may include one or more of the following features and advantages.

In some applications, hybrid power generating systems can function with improved performance as compared with a single wind turbine generator or a single solar generator. For instance, as a result of the innate synergy between the various assemblies in the hybrid system, the power output is generated in a much more efficient way than any of these components alone. Also, the hybrid system can provide higher power output in the daytime and non-interrupted electricity throughout day and night, thereby reducing the cost of electricity generation and the need for storage battery that can be both expensive and undependable.

In some applications, the whole system can be mounted in vertical, horizontal, or other aligned operational positions and converts air currents to generate electricity with additional mechanical energy derived from the solar powered Stirling engines. Also, this structure-balanced design uses largely of high-strength, non-corrosive, shock absorbent, vibration dampening and lightweight advanced composites (e.g., glass fiber, carbon fiber and Kevlar fiber) to reduce weight and noise and to maintain high operational efficiencies and low maintenance cost. For instance, the system may use compression molding parabolic dish, trough, filament wound drive shaft, supporting tubes, sheet laminated wind rotor, windshield, deflector, pultrusion beam, panel and etc.

The system can be used for generating electrical energy for domestic, small commercial uses, especially in the urban and suburban area, from combining solar and wind power. In some implementations, the system include solar energy collectors, a set of multiple stacked solar powered Stirling engines (a type of thermo-mechanical engine), wind turbine generator with high strength and lightweight advanced composite airfoils, blades rotors or vanes, a starting device, engage-disengage mechanisms, and rotary pumps. The whole system can be mounted in vertical, horizontal, or other aligned operational positions. Solar collectors concentrate light through the use of either parabolic concentrator or Fresnel lens. At first a set of solar collector are set up to concentrate sunrays to an absorber, which then heats up the heat transfer fluid to be circulated into the hot zone of the set of multiple stacked of Stirling engines. The Stirling engines convert thermal energy to mechanical energy to provide auxiliary power to the wind turbine generator.

Stirling engines can utilize heat from the solar collectors at high efficiency with low noise. The multiple stacked Stirling engines can share high heat (e.g., up to 400 Celsius) in turn and fully utilize the heat to increase the output of the power that will provide auxiliary driving force to the wind turbine generator.

The additional force powered by solar powered multiple stacked Stirling engines can be considerable, depending on sun intensity, and can allow the solar and wind hybrid electricity generating system to operate as a complementary electricity generator, albeit at reduced efficiency when there is low wind. Also, it can operate as purely a wind turbine when there is no solar radiation available such as during nighttime or rainy and cloudy days. In this mode, the wind turbine is induced to spin by the wind along.

In some embodiments, the wind turbine generator includes at least two rotors, vanes, blades or airfoils and a windshield/deflector that positioned on perimeter of wind turbine. The use of a greater number of turbine blades may provide a lower tip speed and lower noise emission and higher efficiency, but can also be more difficult to start or too weak to produce electricity to meet a house's energy demand. In such cases, it may be desired to provide an auxiliary power from solar energy source to accelerate the rotor to a higher velocity at which the rotor can produce positive torque and generate more electricity.

In some implementations, the wind turbine generator has a base rotationally mounted to its main shaft for orienting at least two air rotors into the wind flow. A self-orienting wind shield/deflector can be mechanically affixed to the shafts of the wind turbine with traditional or maglev bearing sets, or can rotate on the rail guide around the wind turbine to direct the wind flow substantially only to blades and to block wind flow to the backside of the rotors, therefore preventing the wind from inhibiting the rotation of the rotor assembly. In some examples, the wind deflectors with bend are angle-mounted on the outside edge of the windshields against the incoming wind flow for directing the wind towards to the rotor blades at a more efficient angle.

At least two types of the windshield/deflectors can be symmetrically mounted to both sides of the wind turbine. When wind flow changes direction, the windshield/deflector will rotate accordingly and face the wind flow with same position angle. The self-adjustable and self-balancing features of the deflector with bends pointing to opposite directions, permit the deflectors to provide a counter force against each other in the event that the wind, in engaging any of the deflectors, tend to rotate the assembly out of alignment. Windshields can be coupled by bearings, for instance, to a drive shaft concentric with the shaft to the wind turbine and has an arc-cylindrical body portion that rotates freely around the wind rotors. When air currents move towards the wind collector, the windshields and deflectors are moved by and aligned with the wind in same balanced and angled positions. The windshields and deflectors are positioned and shaped to direct the wind flow substantially only to rotors that will be moved in the same direction of the wind flow. They also block wind flow from hitting rotors that will be moved in the opposite direction of the wind flow.

Examples of solar collectors include parabolic solar collectors, which are examples of so called "Imaging Solar Concentrators" that attempt to produce a small but high intense "image" of solar energy at the focal point or focal line. Due to their "Imaging Optics" geometry, the aperture of the collector need to directly face the sun, in order to avoid loss of collection efficiency and to maintain the "solar Image" with the solar absorber. In some examples, parabolic solar collector and Fresnel lens concentrator can use sun track devices (heliostat) to keep them oriented toward the sun.

Some other examples of solar collectors include Fresnel lens concentrators. The Fresnel lens can be made from a smooth flexible transparent polymeric material having a smooth surface and an opposite surface consisting of a plurality of miniature linear Fresnel prisms or arranged side by side, with the smooth surface effectively forming one of the optical faces of each prism. In addition, each prism includes an optical face that is intended to redirect the light. Each prism also has a non-active optical face or step that does not block or interfere with the directed solar radiation. Thus, the prisms in the film are arranged such that the steps defined by the prisms do not interfere with the refraction of the incident solar radiation. Further, in some embodiments, the Fresnel lens is oriented so that the more fragile Fresnel prism will not be directly exposed to hail, rain, or other destructive environmental events.

Further examples of solar collectors include an economic parabolic trough type that is equipped with a compound parabolic collector (CPC) that permits wider sunrays receiving angle and more efficient energy collection, without necessarily using costly apparatus for tracking the sun in its apparent daily motion through the celestial sphere. The CPC may be set up to have one axis aligned to be roughly parallel to the axis of rotation of the earth around the north and south poles. For use in the north hemisphere, the polar axis can be angled towards due north, and the angle between this axis and the vertical is equal to the latitude. In some examples, a real-time clock controller and linear actuator arm are used to move the trough array toward the sun movement of Azimuth. This setup also has an adjustment (monthly or bi-monthly) along a second axis: the angle of declination. The second adjustment will angle the compound parabolic troughs array to face the sun when it is higher in the sky (and further northward) in the summer, and to face it lower in the sky (and further southward) in the winter for the optimal position for each season. It might be set with manual (monthly or bi-monthly) or automated adjustments, depending on polar alignment. This type of solar collector does not necessarily use sophisticated, expensive and possibly undependable heliostat (sun tracker) that is prone to misalignment due to cloud interference.

In some implementations, the Stirling engines may require some initial disturbance in order to transit from a state of static instability to oscillatory motion. This initial disturbance needs to be sufficient to cause some movement of the displacer piston of the Stirling engines in order to initiate further and regenerative heating or cooling and consequent further expansion or contraction of the working gas. The regenerator, which is generally located between cold and hot zones of the engine, includes a matrix of fine wire.

In some examples, the initial motion of the Stirling engines may be impeded by the friction between conventional seals that separate the different zones inside the Stirling engines. If the initial disturbance is insufficient to overcome the friction, there may not be enough displacement of the heat transfer fluid to develop sufficient pressure change to continue the motion.

One way to reliably start a Stirling engine generates the initial disturbance by input from load or external sources. This can allow the engine to start even though it is horizontally aligned and therefore is subject to a seal friction that is greater than in a vertically aligned engine. This starting mechanism is simple, inexpensive and does not require periodic adjustment or maintenance. It can be activated by the intensity of sunrays that is in accord with the power generation of Stirling engines.

One example of such a starting mechanism includes an auxiliary electric starter motor, thermocouples, two rotary pumps, pulleys/V belt mechanisms and closed cycle HTF circulation system. The flywheels and pumping rotor housing are affixed with the drive shaft of the Stirling engines and also is connected with the auxiliary electric starter motor by pulleys and V belt. The concentrated sunrays heat up the heat transfer fluid of absorber to a set temperature (e.g., 100 Celsius) then the thermocouple activates the auxiliary starter motor and the HTF rotary pump to circulate heat transfer fluid through the hot zone of the multiple Stirling engines. The heated heat transfer fluid will keep heating up the hot zone of the multiple Stirling engines and the rotating flywheels that are driven by the said auxiliary starter motor, move the crankshaft, power piston and displacer of the Stirling engines into oscillation. Once the temperature of the heat transfer fluid running through the hot zone of multiple Stirling engines reaches a higher set temperature (e.g., 150 Celsius), the starter motor will be shut off and disengaged with the Stirling engines. At the same time the wind turbine engages with the rotating Stirling engines to combine the dual driving force to generate electricity.

A first engage/disengage mechanism is provided for mechanically engaging and for disengaging the driving shafts of the auxiliary motor and Stirling engines with said pulleys and V belts set. The pulley sets of drive shafts use rubber v-shaped driving belt to transfer driving force from the auxiliary starter motor to the drive shaft of Stirling engines. The engage/disengage mechanisms has the third pulley form a triangle set up with the above said pulley sets and a small engage/disengage electric motor can be activated by the same thermocouple of the said auxiliary motor. The small engage/disengage electric motor retract/tighten (engage) the v-shaped driving belt at the first set temperature (e.g., 100 Celsius) to drive the Stirling engines into oscillation. At the second set temperature (e.g., 150 Celsius) the small engage/disengage electric motor extend/loosen (disengage) the v-shaped driving belt when the Stirling engines are running strongly and the said auxiliary starter motor is off. All three pulleys have large flanges to hold the v-shaped belt in the grooves when the belt is in loose (disengage) and slack state.

A second engage/disengage mechanism is provided for coupling the driving shafts of Stirling engines and the wind turbine generator. This mechanism also uses pulleys and V belts set. The pulley sets of both drive shafts use rubber v-shaped driving belt to transfer driving force from Stirling engines to the wind turbine generator. The second engage/disengage mechanism also has the third pulley forming a triangle setup with the above said pulley sets and a small engage/disengage electric motor that can be activated by the second thermocouple of the control module. When the HTF temperature reaches the first set temperature (e.g., 150 Celsius), the engagement will transfer the multiple Stirling engines driving power to the wind turbine generator. Once the HTF temperature below the second set temperature (e.g., 100 Celsius) the disengagement disconnect the wind turbine from the Stirling engines. All three pulleys also have large flanges to hold the v-shaped belt in the grooves when the belt is in loose (disengaged) and slack position.

The heat transfer fluid is circulated in a closed loop system to maintain the high heat and the whole system is double insulated (e.g., by fiberglass) to reduce the heat loss.

In some examples, the multiple Stirling engines can be equipped with water jacket that surrounds the cold zone of the multiple Stirling engines. A rotary water pump circulates cooling water from water reservoirs to water jacket (cold zone) of the multiple Stirling engines and back. The reservoirs of the cooling system include a cold tank and an insulated hot tank that are connected on at the top. The hot tank is connected to the hot water pipeline that runs into the building and cold tank is connected with water supply line for replenishing. When the hot water of the hot tank is used and not feeding back into the cold tank, the water supply line will be triggered by the water float device and replenish the cold water instead. This refill from waterline will greatly reduce the temperature of the cold tank of the cooling system to further enhance the cooling process and increase the power efficiency of the stacked Stirling engines. The cold zone temperature is important when looking for efficiency gains; for example, a change of 10 Celsius at the cold zone can have an equivalent effect on the ideal cycle efficiency of a change of 30 Celsius at the hot zone. Therefore, a radiator type heat sink (metal device with many fins) covers the cooling agent upstream conduit to the water jacket and runs parallel with the wind rotors axis. The wind flow entering into or exiting from the said wind turbine can improve the transfer of thermal energy from the heat sink to the air by moving cooler air between the fins so that the efficient heat dissipation is promptly obtained. The cooling agent is circulated in a semi-closed loop system to conserve the water and provide thermal energy for hot water and space heating to the dwelling.

In some examples, in cold climate and high heating demand areas, the multiple Stirling engines can be coupled to a second (potentially indoor) heat collector that receives thermal energy from additional heat sources, for example, from space heating such as a gas burner or a wood burning appliance of the dwelling during the nighttime or overcast days of cold weather. The same rotary pump of the system circulates the additional heat transfer fluid (HTF) from the indoor heat collector (e.g., gas burner) to the hot zone of the series of Stirling engines and back to complete another closed heating cycle. In response to environmental conditions, for instance, wind condition, sun condition, and temperature condition, these two closed heating cycles can be combined to boost output of the Stirling engines in the day time or this additional heat source work with wind turbine in the nighttime. In cold days, the returned hot water from the cold zone of the Stirling engines can be used in a radiator heater for space heating. As such, this solar and wind hybrid generator plus combined heat and power (CHP) system utilizes the excess heat and also provides waste heat for the home with the added benefit of electricity production.

In some implementations, the oscillating power pistons of the stacked Stirling engines use flywheels, driving shaft and the v-shaped driving belt to transfer mechanical power to the wind turbine generator. During sunny and low wind days, the Stirling engines will fully operate to provide additional mechanical energy derived from the sunrays. During rainy days or cloudy days with low sunrays, the sun collectors may not generate enough heat to power Stirling engines. Thus, the wind turbine generator may be decoupled from the Stirling engines. In the nighttime, the coupling is also off to eliminate the dead weight load and mechanic friction of Stirling engine to the wind turbine. Thus, the system operates as solar and wind hybrid powered generator in the daytime and wind turbine rotates alone in the nighttime, rainy, cloudy and snowy days unless the said additional heat source replaces the solar energy and drives the Sirling engines instead.

The integrated and flexible design of the system does not require sophisticated electronic device and a high degree of precision in manufacturing. Since materials of high thermal tolerance are not necessarily required for the majority of the design, the solar energy collector and concentrator can largely use high strength, non-corrosive, shock absorbent, vibration dampening and lightweight advanced composite (glass fiber and carbon fiber). The wind collector incorporates with the high strength and lightweight advanced composite (e.g., S glass fiber, high modulus carbon fiber and Kevlar fiber) airfoils, blades, rotors or vanes to generate electricity. Such an integrated structure is also not susceptible to damage by strong winds, temperature, moisture and other elements. In some examples, the Stirling engines, the reflective film of solar collectors, and the Fresnel lens can be fabricated using industrial grade aluminum, aluminum coating reflective Mylar film, and/or acrylic plastic, thereby reducing the manufacturing cost.

In some implementations, the solar collector may be located on top of the wind turbine or beneath it so the wind rotor would not be obstructed from direct access to the prevailing wind. Because the systems use modular design and are structure balanced, it would also be easy to scale up the system by adding more Stirling engines or wind turbines or enlarging the size of solar collector and wind turbine. As the wind power increases as a function of the cube of the surface area of the rotor as well as a function of the height of wind turbine, wind forces placed on the assemblies can be fully utilized as the system is enlarged to create more power or use higher stand-along structure. Furthermore, in practical applications, such systems can be located at sites such as rooftop or stand alone in a backyard or a parking lot, and be suitable for both residential and commercial uses.

Other features and advantages of the invention are apparent from the following description, and from the claims.

DESCRIPTION OF DRAWINGS

FIG. 2B is a schematic diagram of another embodiment of the hybrid system of FIG. 1 configured in a horizontally aligned operational position.

FIG. 8B illustrates two ways of mounting the windshield-deflector structure to the wind turbine.

FIGS. 13A-13D show four operational positions of two engage-disengage mechanisms of the hybrid system.

FIG. 20 shows the use of solar panels to generate additional electricity to supply the electric requirements of a hybrid system or to combine the electrical currents via electrical coupling means.

DETAILED DESCRIPTION

1 Overview

Figure 1:
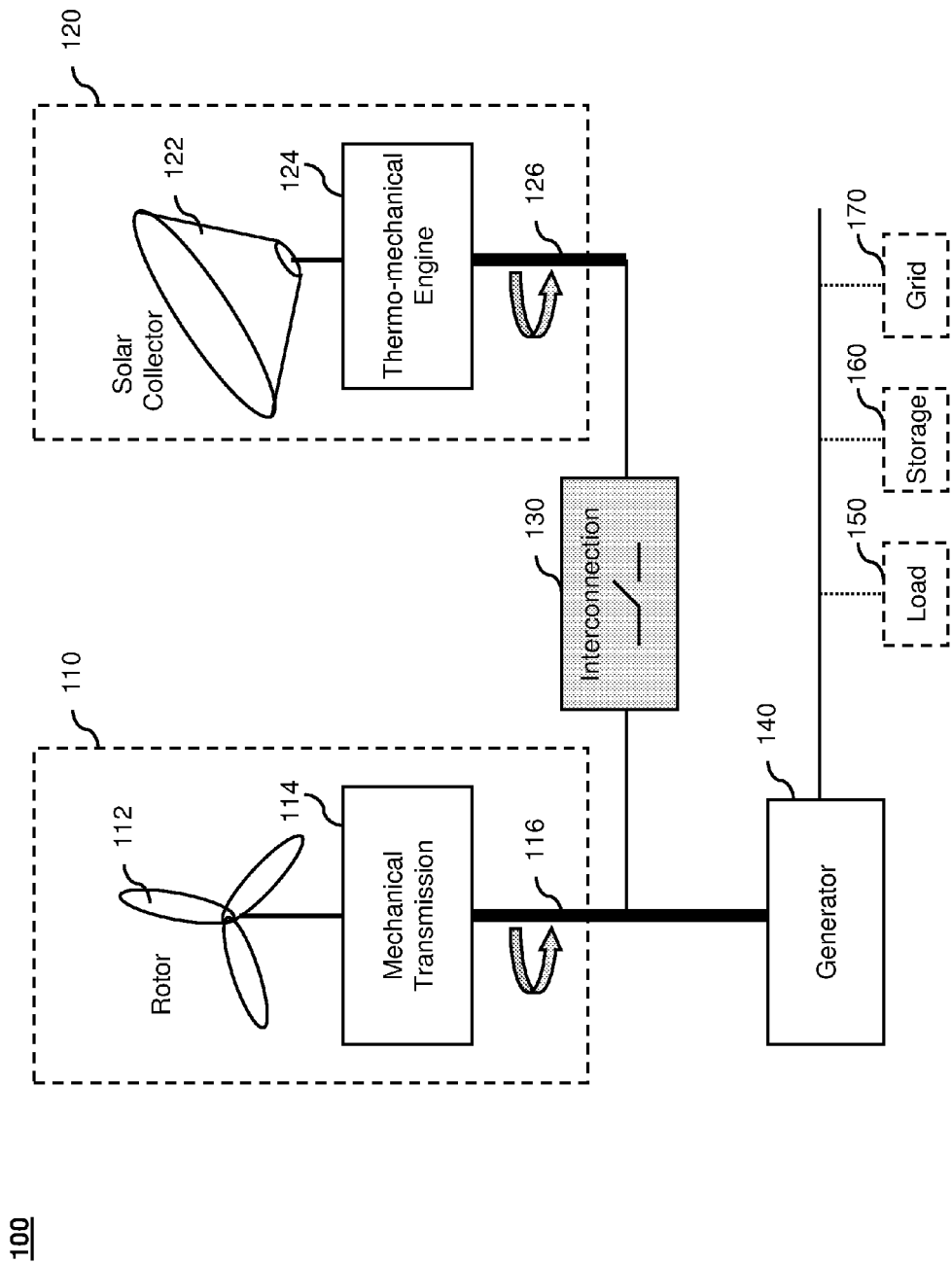
FIG. 1 is a block diagram of a hybrid system for generating energy from solar and wind energy sources.

Referring to FIG. 1, a hybrid system 100 is configured for generating electricity from both wind and solar energy sources. The system 100 includes a wind powered subsystem 110 having a rotor 112 (e.g., a wind turbine) for receiving wind to generate mechanical energy, and a mechanical transmission mechanism 114 (e.g., a set of gears and/or shafts) for transmitting the generated mechanical energy to a main shaft 116 of the wind powered subsystem 110 to drive an electrical generator 140. Depending on the particular applications, the electrical generator 140 can be a synchronized generator or an asynchronized generator, and the electricity output of the generator can be used by a load 150 (e.g., home appliances), be stored in a storage unit 160 (e.g., a set of batteries), or be provided to an electrical grid 170.

The hybrid system 100 also includes a solar powered subsystem 120 having a solar collector 122 (e.g., a parabolic dish) for converting solar energy into heat, and a thermo-mechanical engine 124 (e.g., an external combustion engine) for subsequently converting heat into mechanical energy to drive a main shaft 126 of the solar powered subsystem 120.

To utilize the energy generated by the solar powered subsystem 120, an interconnection subsystem 130 is provided for disengageably coupling the main shaft 126 of the solar powered subsystem to the main shaft 116 of the wind powered subsystem. As a result, the mechanical energy derived respectively from wind and solar sources is combined together to power the electrical generator 140.

Generally, the wind powered subsystem 110 operates regardless of weather conditions, but the amount of electrical energy generated from wind may depend on local wind speed. The solar powered subsystem 120, on the other hand, is selectively activated, for instance, based on sun intensity. During the operation of the solar powered subsystem 120, when shaft 126 is coupled to shaft 116, the input to the electrical generator 140 is increased as a result of the superposition of the mechanical energy derived from the two subsystems 110 and 120. Thus, the hybrid system 100 can produce a greater amount of electricity when the two subsystems 110 and 120 operate in a complementary mode. It can also operate solely as a wind powered system when there is no solar radiation available such as during nighttime or rainy and cloudy days, in which case the rotor 112 is induced to spin by the wind alone.

The following description includes discussions of various embodiments of the hybrid system 100 of FIG. 1 and mechanisms by which the system can operate.

2 Exemplary Embodiments of Hybrid Energy Conversion Systems

Figure 2A:
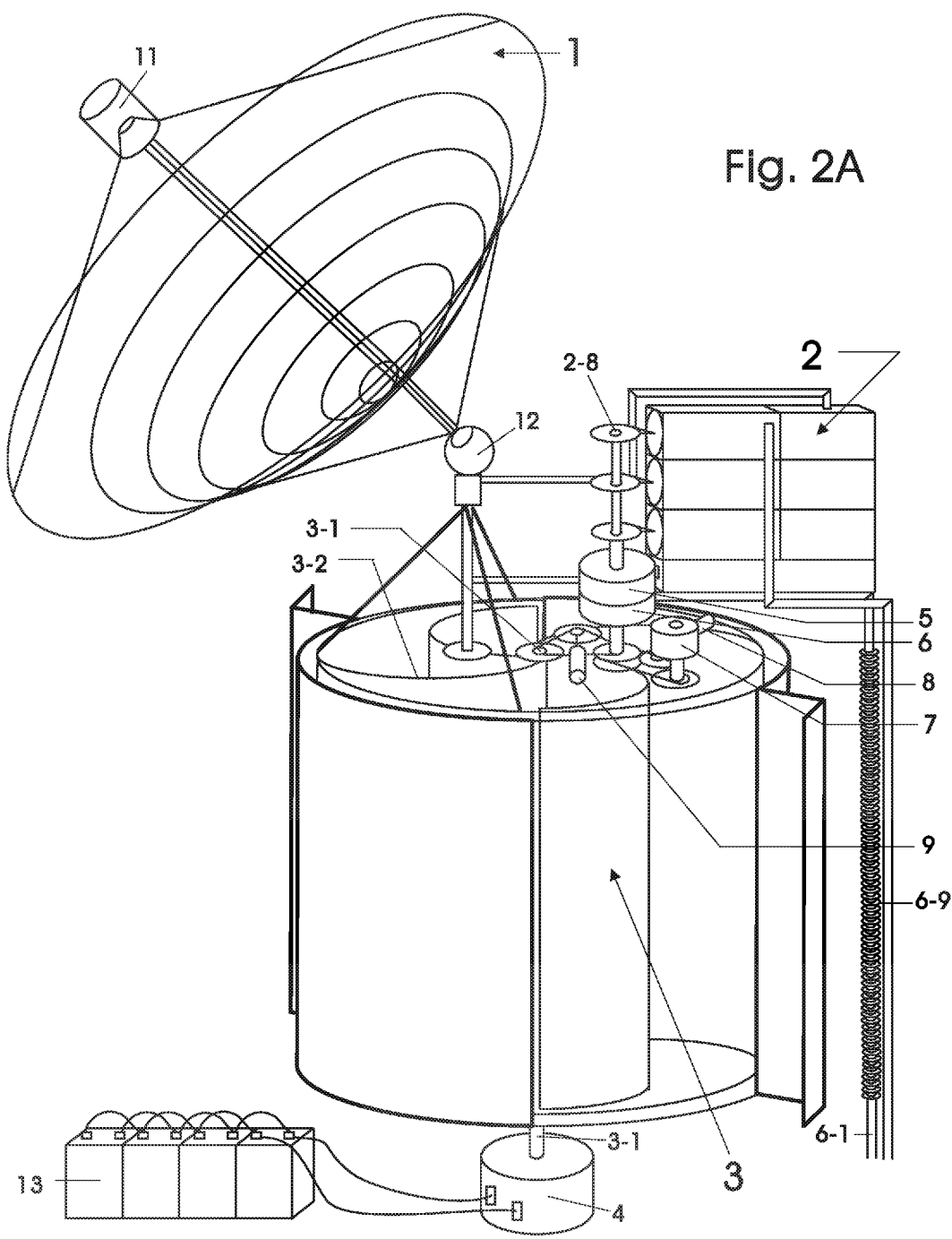
FIG. 2A is a schematic diagram of one embodiment of the hybrid system of FIG. 1 configured in a vertically aligned operational position.

FIG. 2A shows one embodiment of the hybrid system 100 of FIG. 1 configured in a vertically aligned operational position.

This system includes a solar collector 1, a set of stacked Stirling engines 2 (a type of thermo-mechanical engine), a wind turbine 3, an electrical generator 4, a first rotary pump 5 for circulating heat transfer fluid, a second rotary pump 6 for circulating cooling agent, an auxiliary starter motor 7, two engage/disengage electric motors 8 and 9, and a heat sink 6-9 of cooling agent upstream conduit 6-1. Shaft 3-1 serves as the main drive shaft of the wind turbine 3, and shaft 2-8 serves as the main drive shaft of the Stirling engines 2. These two shafts can be coupled and decoupled by use of the engage/disengage electric motors 9, as will be described in detail at a later section of this document.

The solar collector 1 receives solar energy and generates heat (e.g., up to 400 Celsius) to power the multiple Stirling engines 2 to apply a complementary force to rotate the wind turbine generator 4 about its drive shaft 3-1, thereby generating electricity concurrently. In order to convert the mechanical energy to electrical energy, a mechanical-to-electrical converter, for instance, the electrical generator 4, is used. The generator 4 is mechanically coupled by the drive shaft 3-1 to the wind turbine 3 to produce useful output. If desired, the electricity generated by the generator 4 is stored in an electrical energy storage device, such as battery banks 13 prior to being used by a consumer. As shown in FIG. 2A, the whole hybrid system can be self-contained in small footprint.

Note that the hybrid system 100 of FIG. 1 can be mounted in vertically aligned, horizontally aligned, or other operational positions to fully utilize the environmental conditions of the location (e.g., if mounted on top of a building).

FIG. 2B illustrates another embodiment of this hybrid system 100 that is mounted in a horizontally aligned operational position. The alignment of the system on top of the slope of a roof can increase the area of wind catching and direct the wind flow onto wind turbine rotors 3-2, which can also increase the wind flow and force, thereby resulting in more power output.

In some applications, the vertical alignment shown in FIG. 2A is adopted so that wind, regardless of its direction, can always cause rotation of the wind turbine rotors 3-2 without adjustment of turbine axis 3-1.

Figure 3:
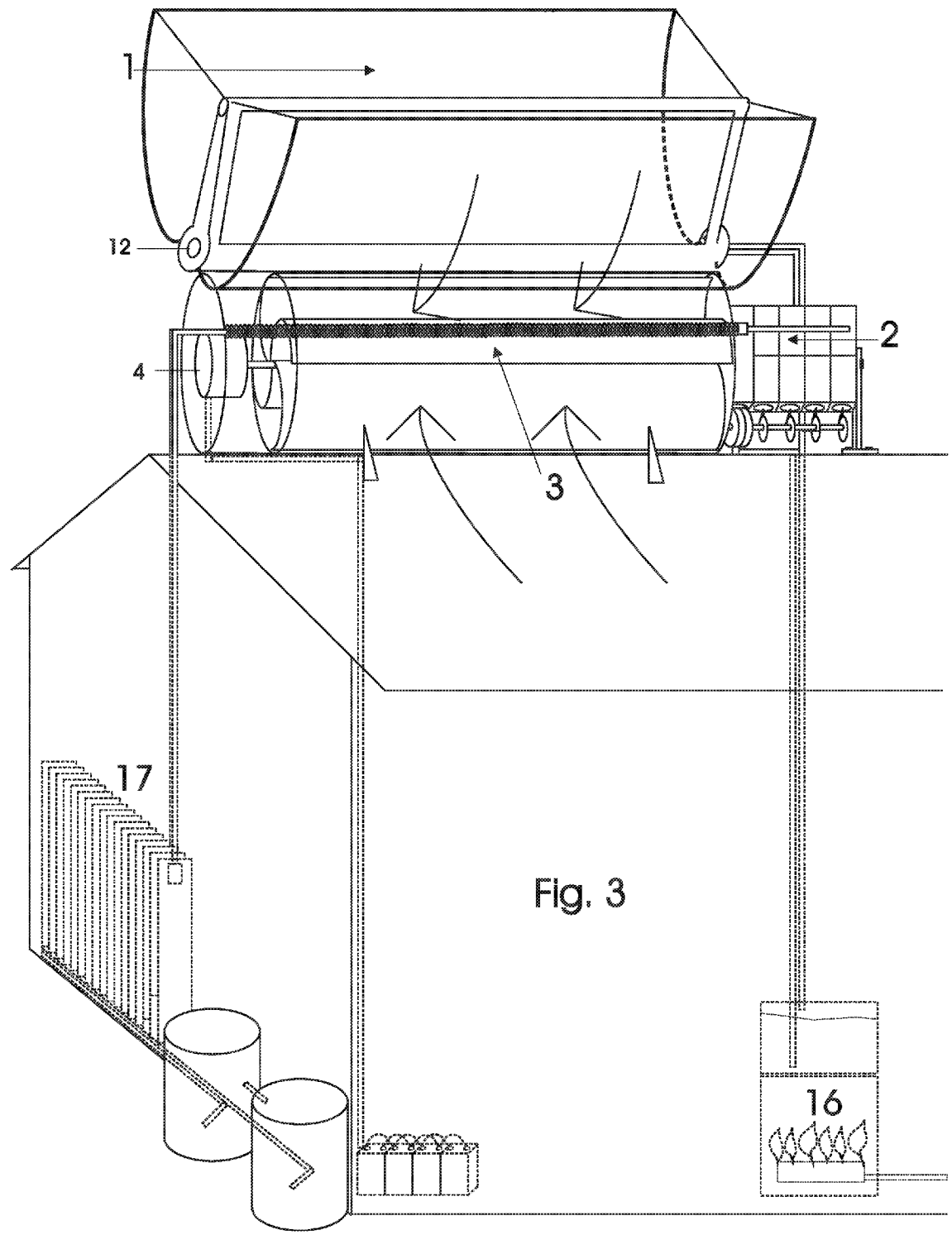
FIG. 3 is a schematic diagram of a further embodiment of the hybrid system of FIG. 1 that is coupled with an additional heat source.

FIG. 3 shows a further embodiment of the hybrid system 100. In cold climate and high heating demand areas, the multiple Stirling engines can be coupled to a second (potentially indoor) heat collector that receives thermal energy from additional sources, for example, from space heating such as a gas burner 16 or a wood burning appliance of the dwelling. A rotary pump can be used to circulate the heat transfer fluid (HTF) from the indoor heat collector (e.g., gas burner 16) to the hot zone of the series of Stirling engines and back to complete additional closed heating cycle. In the nighttime and during overcast days, the returned hot water from the Stirling engines can also be used in a radiator heater 17 for space heating. As such, this system provides heat for the home with the added benefit of electricity production.

Figure 4:
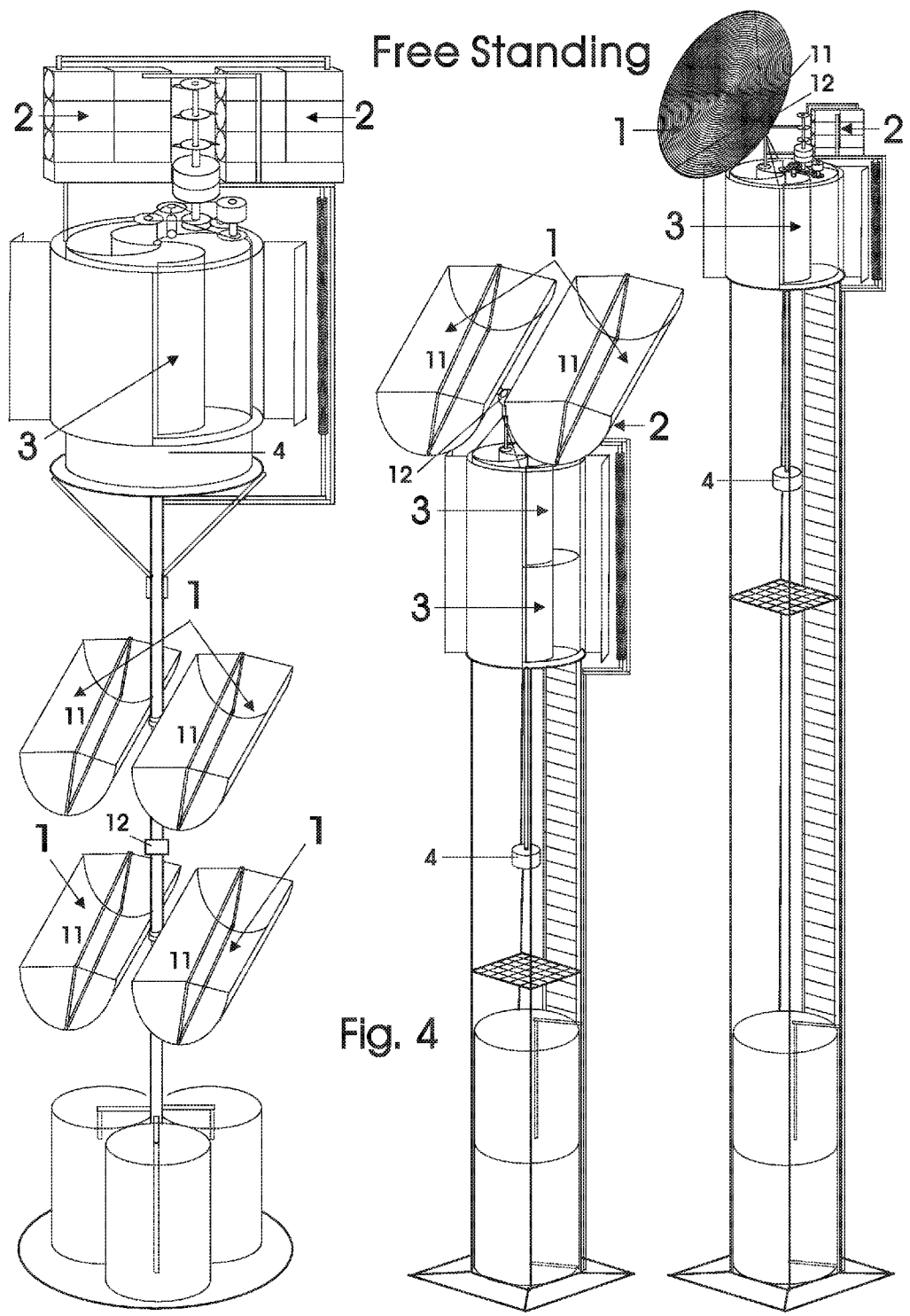
FIG. 4 is a schematic diagram of various configurations of a hybrid system that can be mounted on tower, pole and other freestanding positions and with different kinds of solar collectors.

FIG. 4 shows that the system 100 can be mounted on a high tower, one or more supporting poles, and possibly other free-standing structures and with different kinds of solar collectors.

Figure 5:
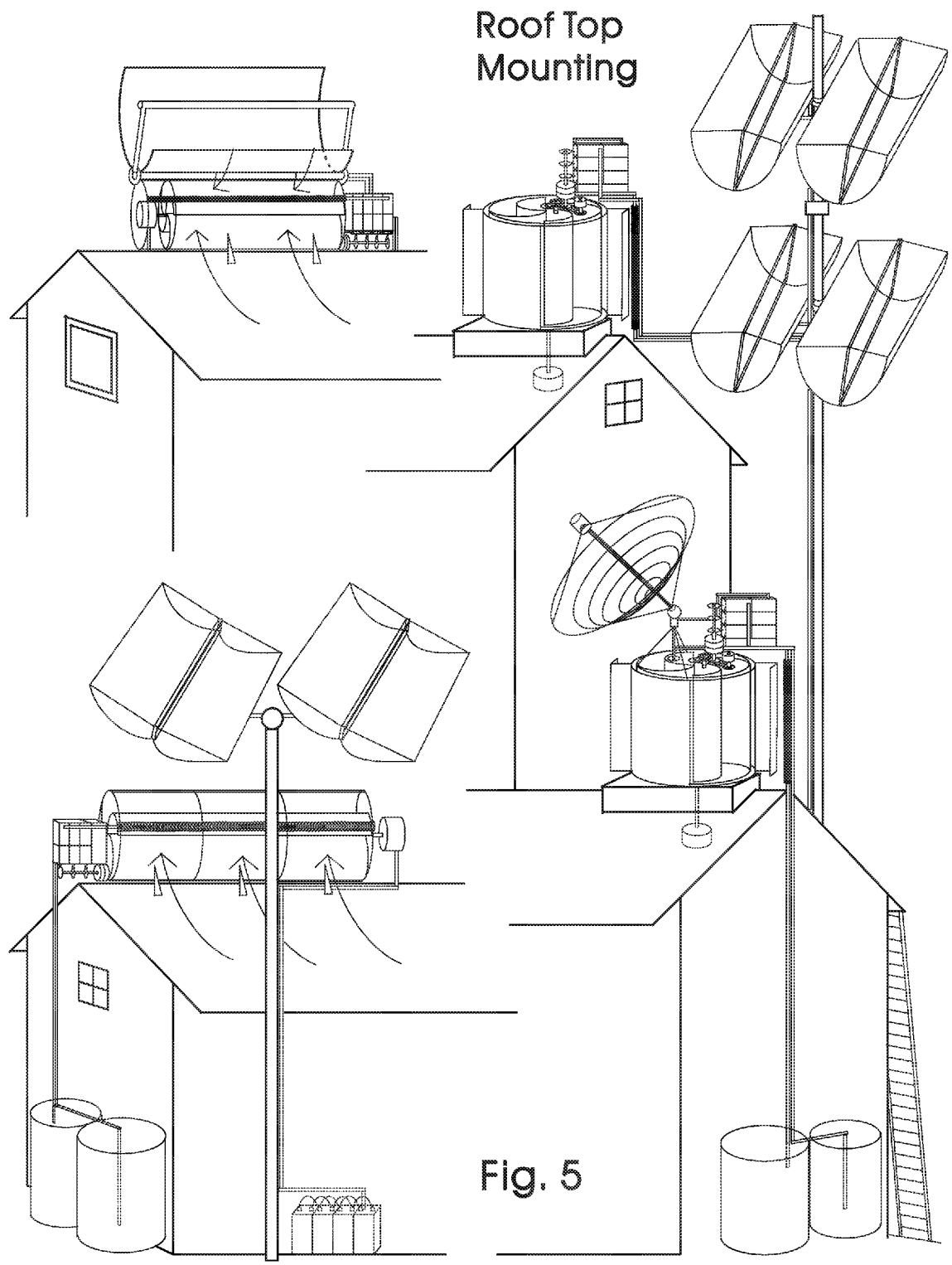
FIG. 5 is a schematic diagram of various configurations of a hybrid system that can be mounted on rooftop in various operational positions and with different kinds of solar collectors.
Figure 6:
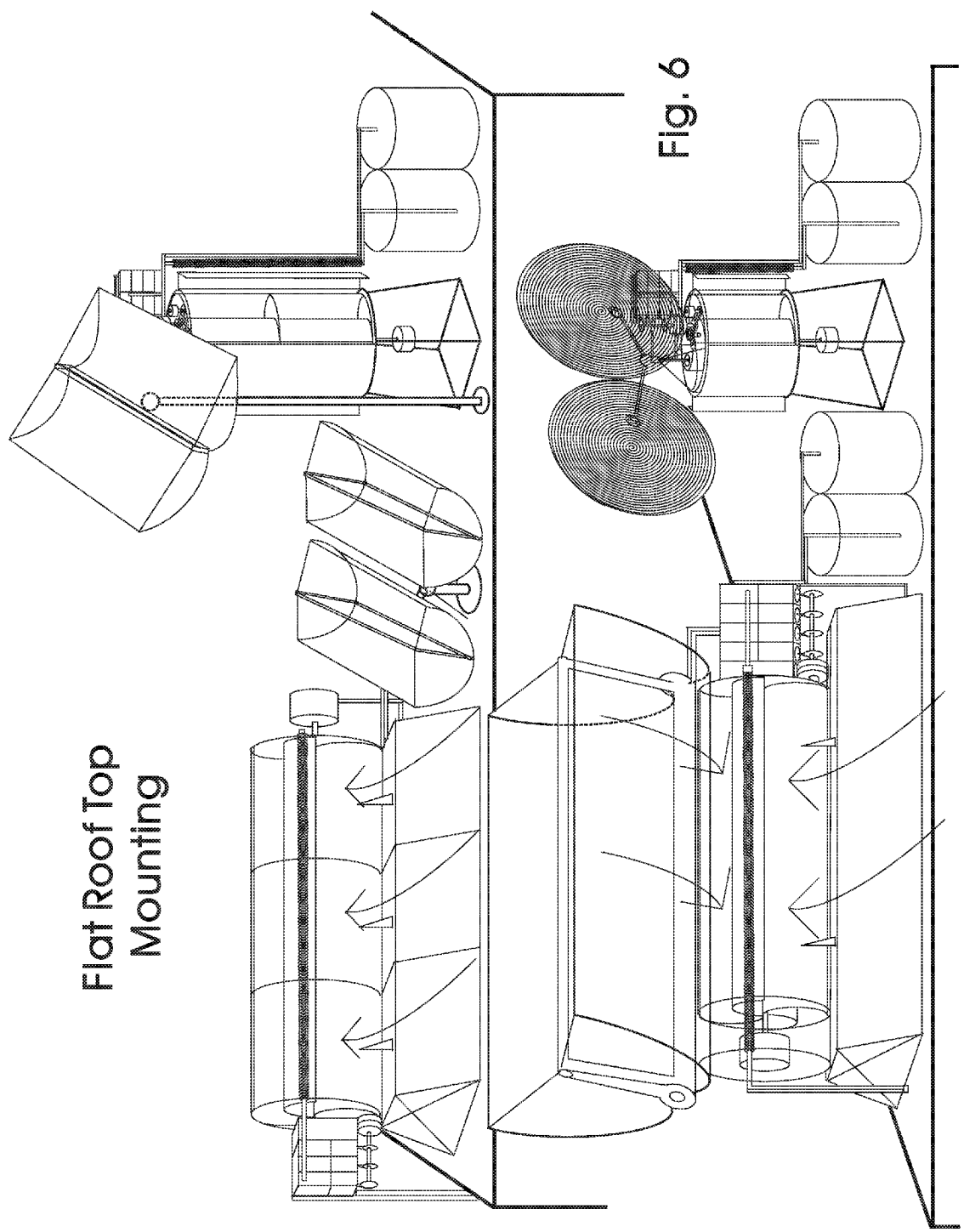
FIG. 6 is a schematic diagram of various configurations of a hybrid system that can be mounted on flat rooftop in various operational positions and with different kinds of solar collectors.

FIGS. 5 and 6 show further embodiments of the hybrid system 100 mounted on tilted rooftop and flat rooftop, respectively.

In the above mentioned embodiments, the solar collector 1 focuses sunrays towards the focal point or focal line of a solar absorber 11. At this focal point or focal line, the energy contained in the solar rays concentrates in a small area. In order to properly position the solar collectors to track the sun during its trajectory, a sun tracker unit (e.g., heliostat) 12 can be used to cause directional changes of the solar collector 1 to aim the collector 1 toward sun.

For some roof-mounted types as shown in FIG. 5 and FIG. 6, the solar collector 1 can be placed on top or by the side of the wind turbine. For some standing types as shown in FIG. 4, the solar collector 1 can be mounted either on top or beneath the wind turbine 3 so that the turbine rotor would not be obstructed from direct access to prevailing wind.

Figure 7:
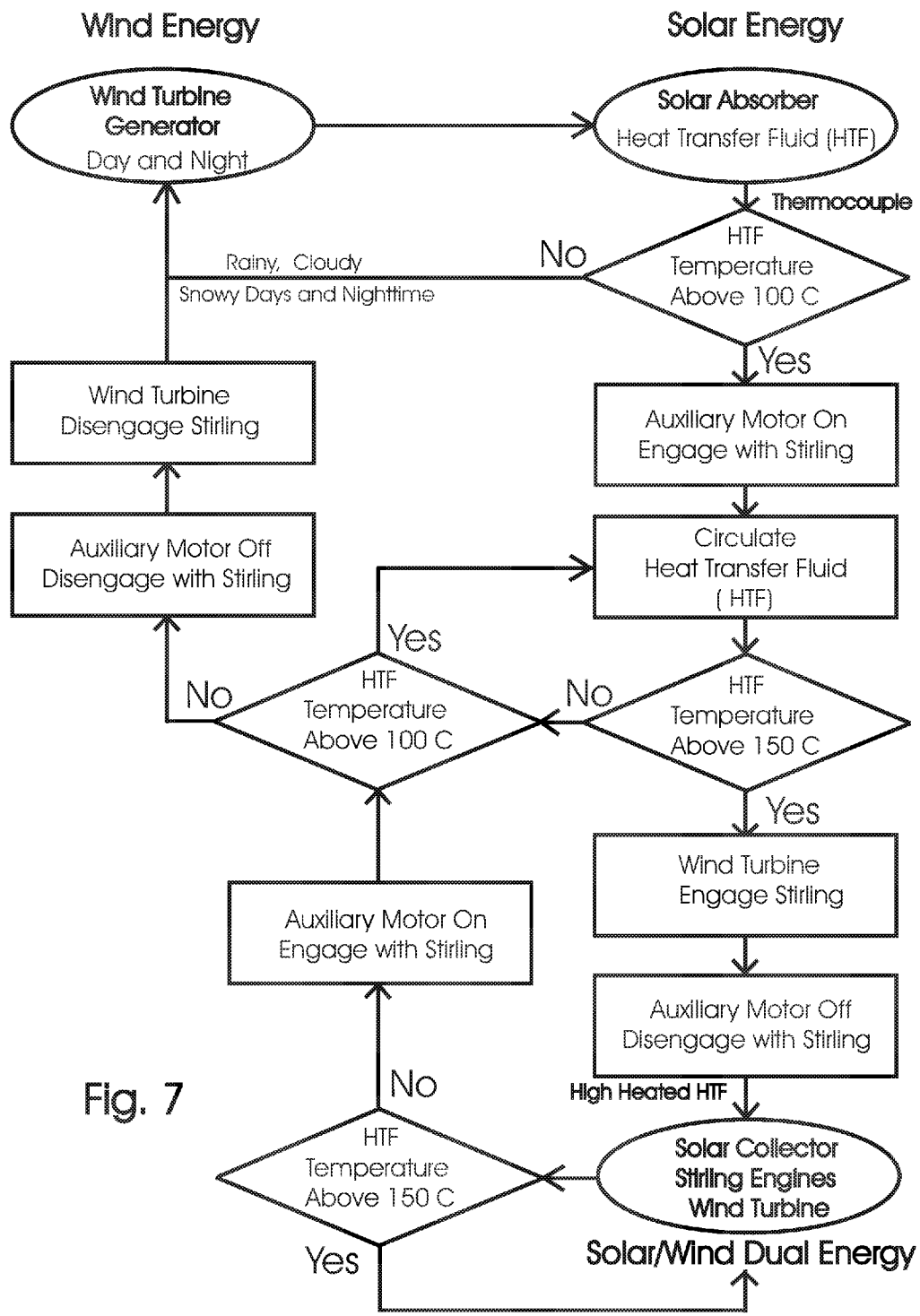
FIG. 7 is a flow diagram of an operation of the hybrid system of FIG. 1.

FIG. 7 shows a flow diagram of an operational procedure of one embodiment of the hybrid system 100 that derives its energy output from both wind and solar energy sources.

3 Windshield Structure for Use with Wind Turbines

Figure 8A:
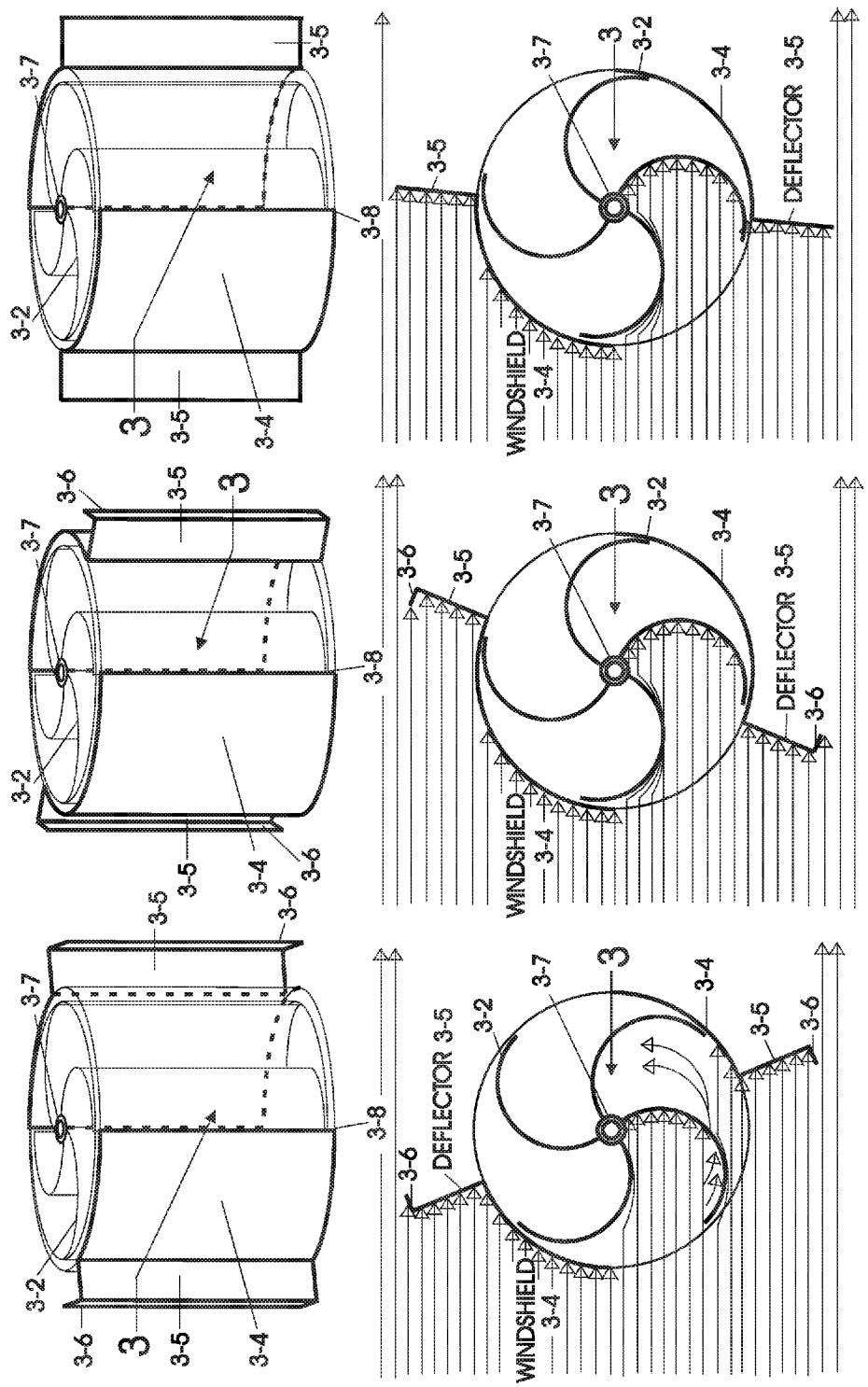
FIG. 8A illustrates two types of a windshield-deflector structure that can be coupled to a wind turbine.

Now referring to FIG. 8A, a wind shield structure is used for directing wind toward desired regions of the wind turbine. In this example, two sets of windshields 3-4 and deflectors 3-5 are positioned symmetrically outside the periphery of the wind turbine 3 to direct the wind flow substantially towards only rotors or blades 3-2. Each deflector also has a bend 3-6 on the outside edge and points to opposite direction. They can also block wind flow to the backside of the rotors so that the wind is prevented from inhibiting the rotation of the rotor assembly.

Each of the windshields 3-4 has an arc-cylindrical body portion and each wind deflector 3-5 with bend 3-6 pointing to opposite directions, is angle mounted on the outside edge of a corresponding windshield 3-4 against the wind flow for directing the wind towards to the rotor blades 3-2 at a more efficient angle. The two windshields and deflectors are symmetrically mounted to both sides of the wind turbine 3 to coordinate the rotation of the wind turbine according to the direction of wind blow as shown in FIG. 8A.

Referring to FIG. 8B, the wind shield structure is configured to be concentric with the main shaft of the wind turbine and can spin freely about the same axis of the rotation of the wind turbine, for example, by mechanically coupling top bearings 3-7 and bottom bearings 3-8 to the shaft 3-1 of the wind turbine 3 with bracket support 3-10. The wind shield structure can slide on a rail guide 3-9 around the wind turbine 3.

Figure 8C:
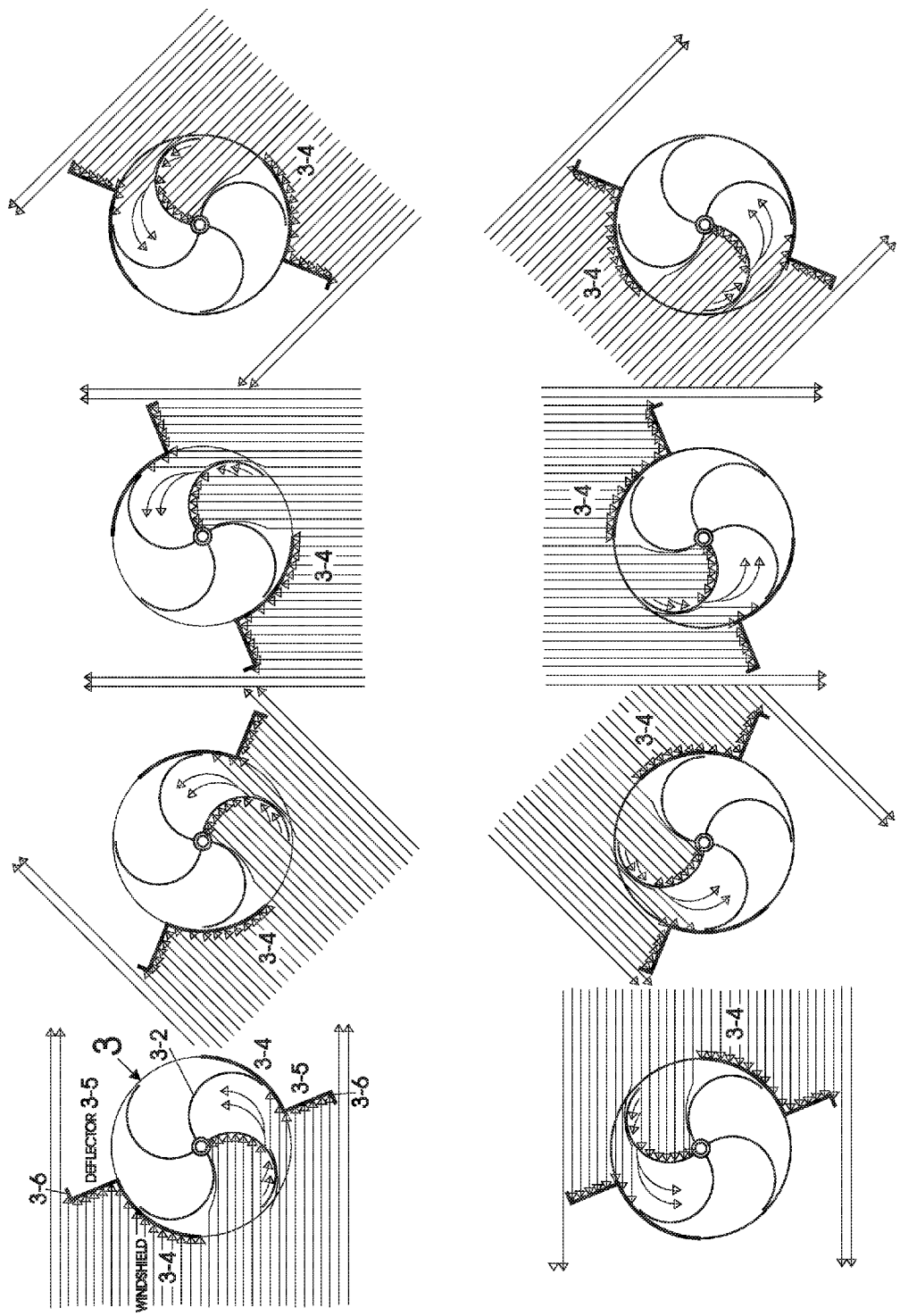
FIG. 8C illustrates alignment of the windshield-deflector structure with wind of various directions.

Referring to FIG. 8C, when air currents move towards the wind turbine 3 in various directions, the windshields and deflectors are moved by and aligned with the wind in the same balanced and angled position as shown in the figure. The windshields 3-4 and deflectors 3-5 are positioned and shaped to direct the wind flow substantially only to rotors 3-2 that are to be moved in the same direction of the wind flow. The windshields and deflectors also block wind flow from acting against rotors 3-2 that are to be moved in the opposite direction of the wind flow.

Note that the symmetric structures oppositely mounted on the wind turbine 3 are useful as they tend to face the wind turbine 3 toward the wind as a result of the forces acting on the self-orienting windshield 3-4 and deflectors 3-5. When wind flow changes direction, the windshield/deflector will rotate accordingly and always face the wind flow with substantially the same angle position. The self-adjustable and self-balanced features of the deflectors 3-5 with bend 3-6 pointing to opposite directions, permit the deflector to provide a counter force in the event that the wind, in engaging any one of the deflectors 3-5, tends to rotate the rotor assembly somewhat out of alignment. In other words, the positions of the deflectors 3-5 are self-adjusted and self-balanced by the wind flow, which applies the same pressure on both symmetrically mounted deflectors to compensate for undesirable rotation of the assembly that may be caused by wind force against the deflectors 3-5.

Figure 9:
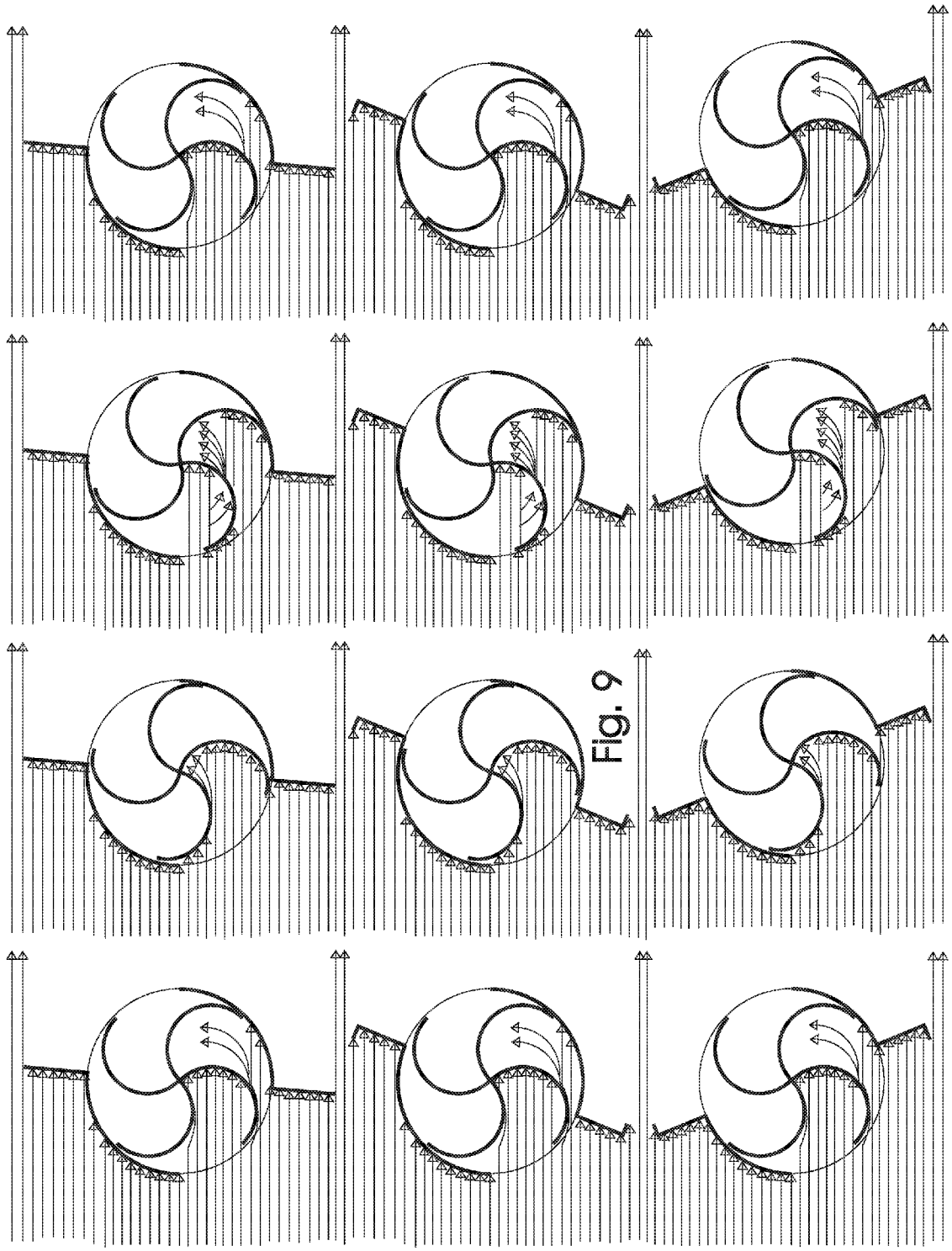
FIG. 9 illustrates the interaction of wind flow with type I windshield-deflector structure on three examples of a Savonius rotor type wind turbine.

FIG. 9 shows the rotation of a wind turbine of different numbers (2, 3, and 4) of rotor blades under wind by use of a type I wind shield structure.

Figure 10:
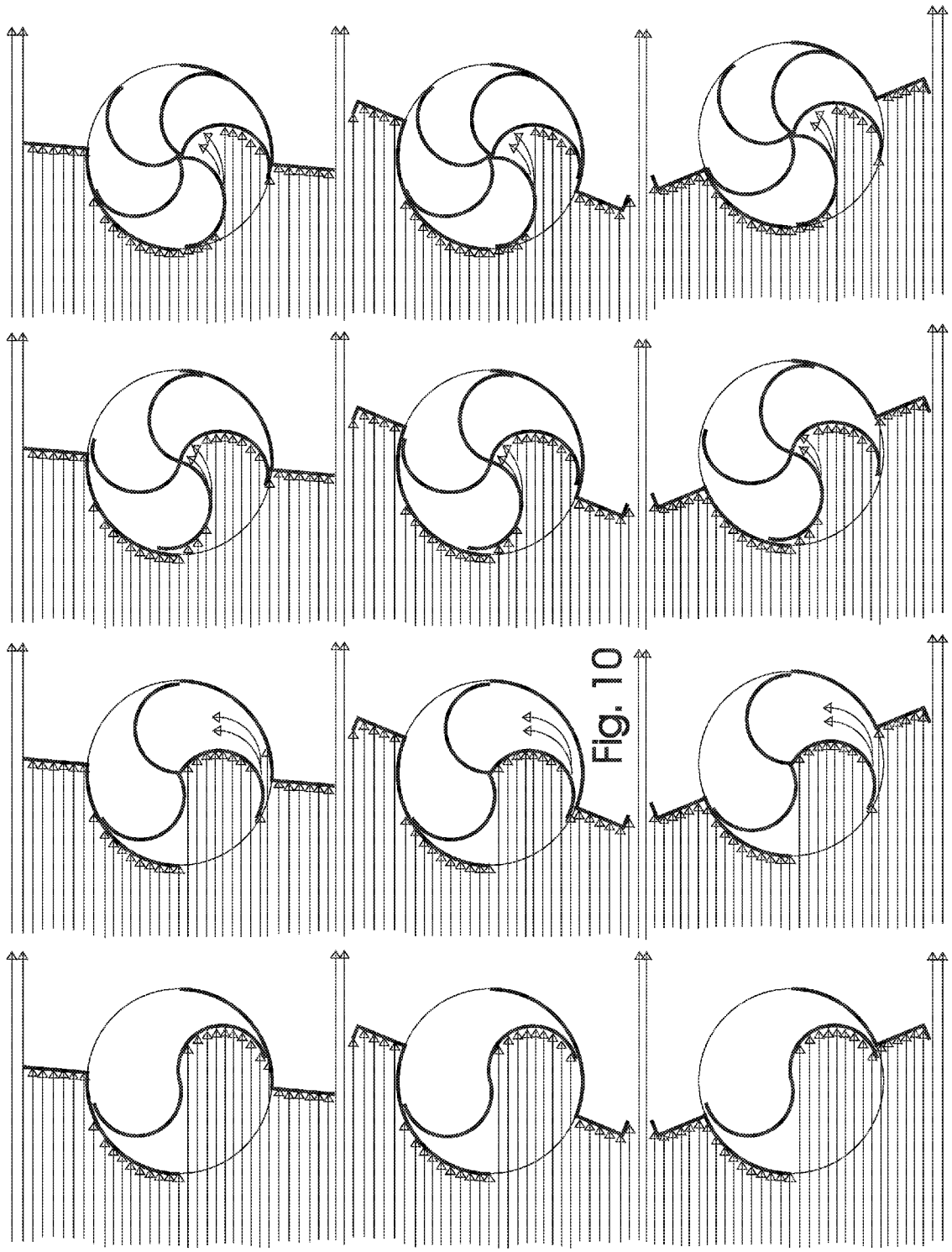
FIG. 10 illustrates the interaction of wind flow with type II windshield-deflector structure on three examples of a Savonius rotor type wind turbine.

FIG. 10 shows the rotation of a wind turbine of different numbers (2, 3, and 4) of rotor blades under wind by use of a type II wind shield structure.

4 Stirling Engine

A Stirling engine is a type of external combustion engines that can convert heat into mechanical energy (e.g., in the form of driving power) by continuously heating and cooling a captive working gas.

Figure 11A:
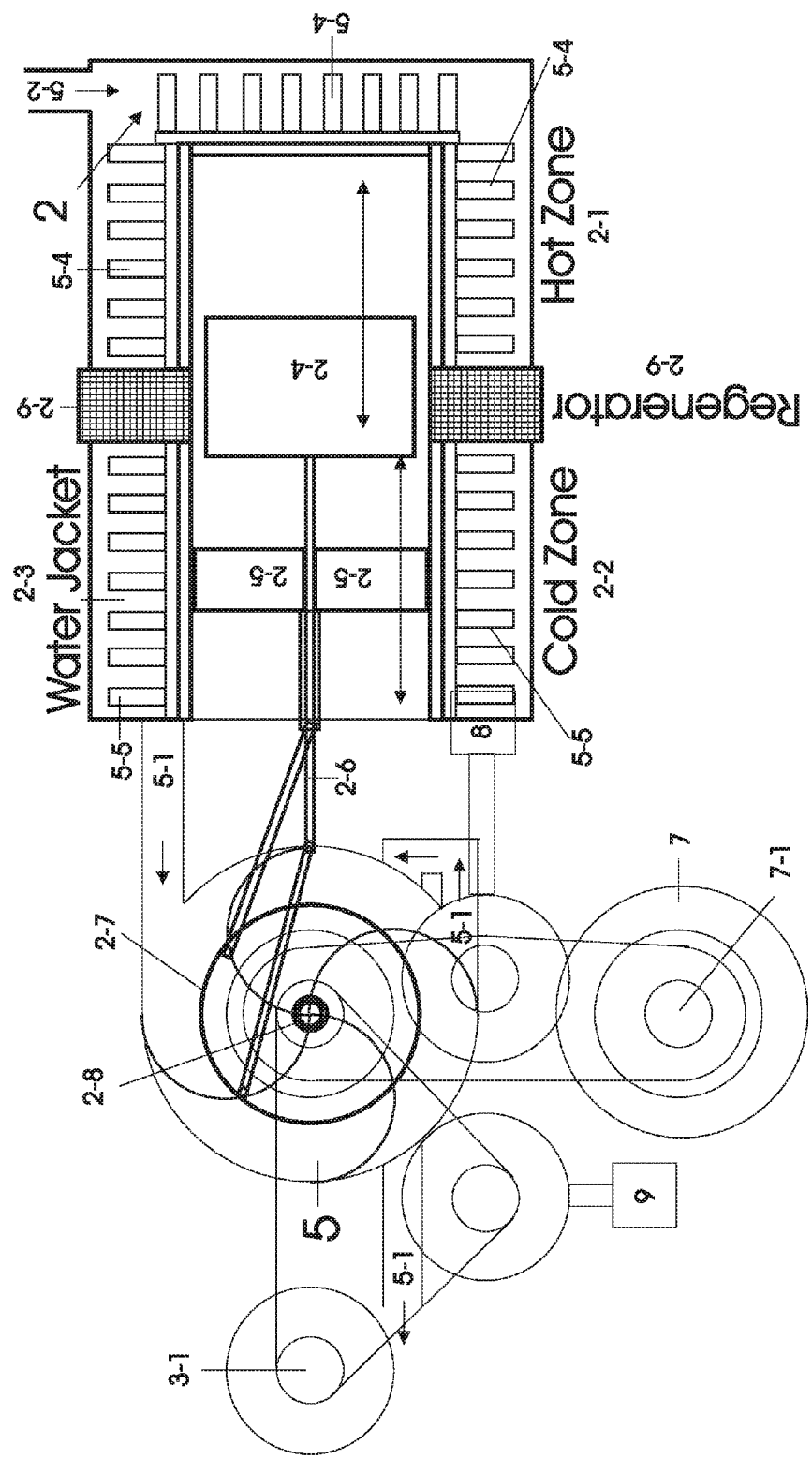
FIG. 11A illustrates an exemplary set of stacked Stirling engines.
Figure 11B:
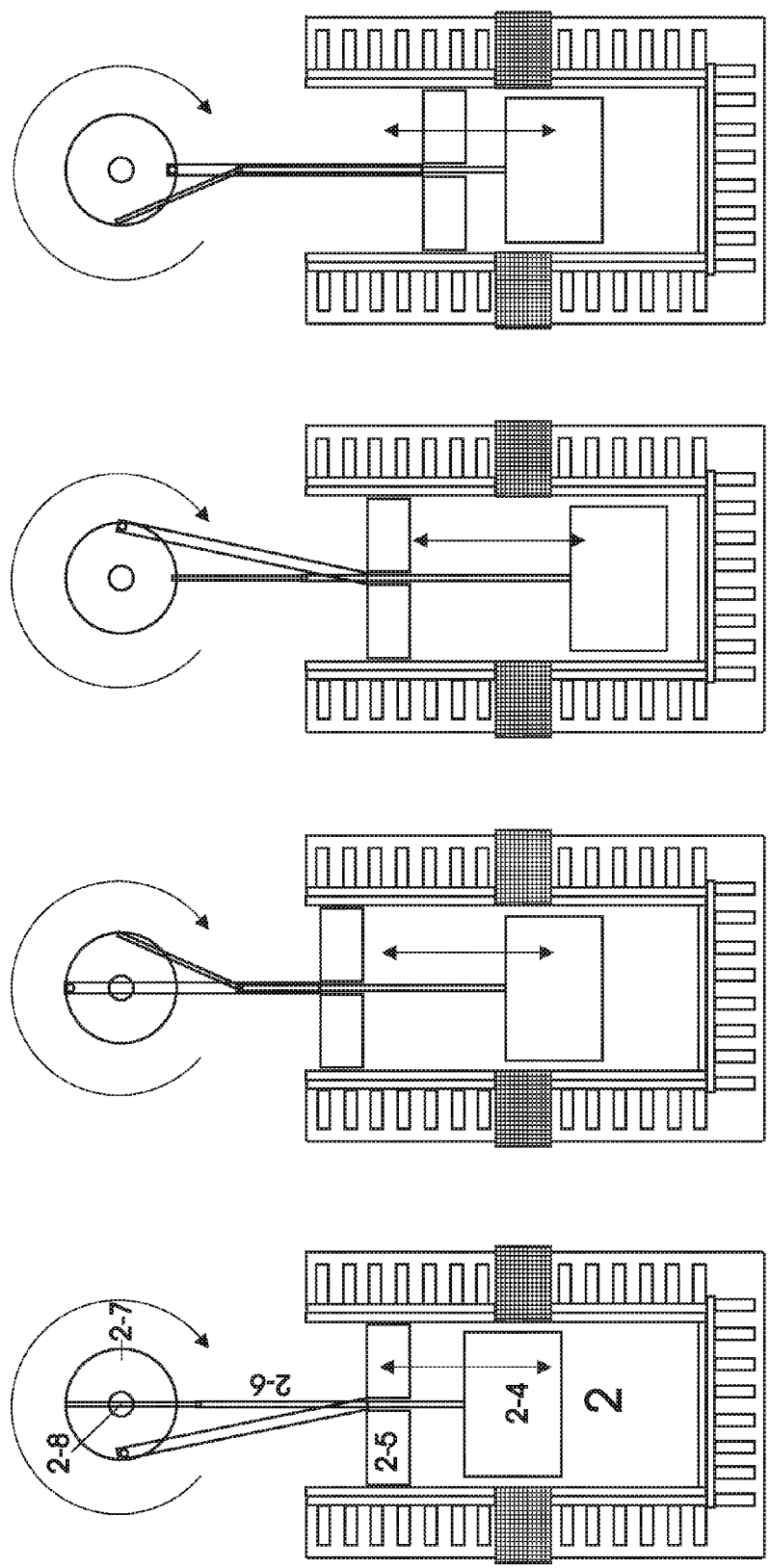
FIG. 11B shows a top view of four representative positions of the Stirling engine of FIG. 11A in a Stirling cycle.

Referring to FIGS. 11A and 11B, one example of the Stirling engine 2 operates on the principle that a working gas expands when heated and contracts when cooled. The Stirling engine includes a hot zone 2-1, a cold zone 2-2, a water jacket 2-3, a displacer piston 2-4, a power piston 2-5, a crankshaft 2-6, a flywheel 2-7, a jointed drive shaft 2-8 and a regenerator 2-9. When a heat transfer fluid heats up the hot zone 2-1 of the Stirling engine, the expanding working gas will force the displacer piston 2-4 and the power piston 2-5 into cyclic motions. The regenerator 2-9 is generally located between hot zone 2-1 and cold zone 2-2 of the Stirling engine and includes a matrix of fine wire. The mechanical linkages of crankshafts 2-6 rotate flywheels 2-7 that are affixed to the jointed drive shaft 2-8 of the multiple stacked Stirling engines 2. The hot zone 2-1 of the engine includes a radiator type heat sink 5-4 (e.g., a heat absorbing device) with fins and/or other means of increasing the surface area that covers the hot zone.

FIG. 11A also shows the corresponding layout of an auxiliary starting motor 7, engage-disengage mechanisms, conduits 5-1, 5-2 and a rotary pump 5 for circulating the heat transfer fluid. FIG. 11B shows snapshots of four representative positions of the Stirling engine pistons 2-4, 2-5, crankshafts 2-6 and flywheel 2-7.

5 Engage/Disengage Mechanisms

Figure 12:
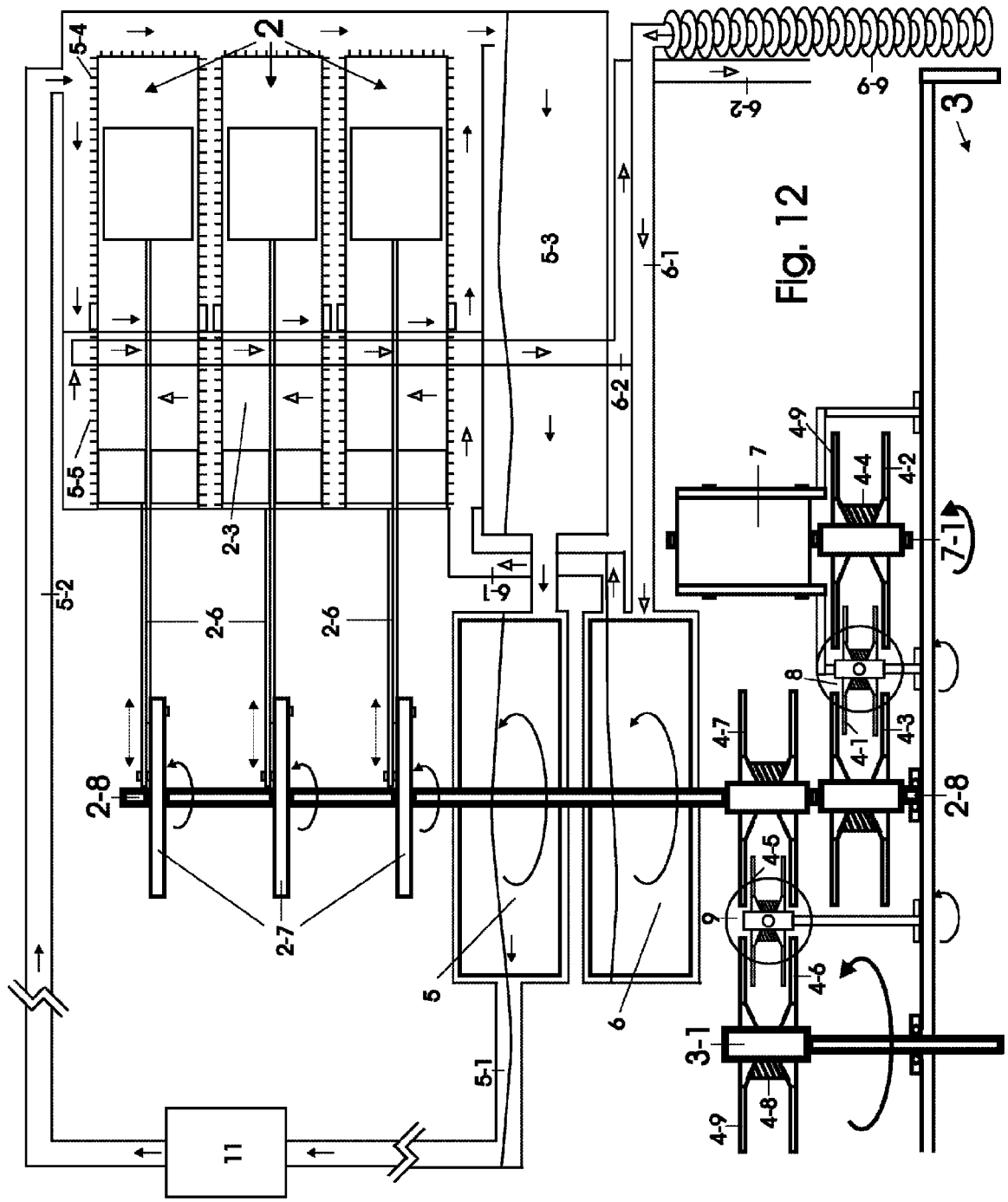
FIG. 12 illustrates the couplings between an auxiliary motor, Stirling engines and a wind turbine shaft.

Referring to FIG. 12, the hybrid system includes an auxiliary motor 7, engage-disengage motors 8, 9, two rotary pumps 5, 6, V belt 4-4, 4-8, pulleys set 4-1, 4-2, 4-3, 4-5, 4-6, 4-7, flywheels 2-7, crankshafts 2-6 and a heat transfer fluid (HTF) reservoir 5-3. A heat transfer fluid circulation system includes rotary pumps 5, upstream conduits 5-1, downstream conduit 5-2, heat transfer fluid reservoir 5-3 and a radiator type heat sink 5-4 of the hot zone 2-1 of the Stirling engines 2. A cooling agent circulation system includes rotary pump 6, upstream conduits 6-1, downstream conduit 6-2, a radiator type heat sink 6-9 (e.g., metal device with many fins) of the cooling agent upstream conduit 6-1 and a radiator type heat sink 5-5 of the cold zone 2-2 of the Stirling engines 2. A drive shaft system includes the drive shaft 2-8 of Stirling engine 2 and the drive shaft 3-1 of wind turbine 3.

To couple (or decouple) Stirling engine drive shaft 2-8 to (or from) wind turbine drive shaft 3-1, an engage/disengage mechanism is provided. This mechanism includes an electric motor 9, a set of V belts 4-8 and pulleys 4-5, 4-6, 4-7 that connect both wind turbine drive shaft 3-1 and Stirling engine drive shaft 2-8 to form a combined power source.

Another engage/disengage mechanism includes electric motor 8, a set of V belts 4-4 and pulleys 4-1, 4-2, 4-3 that connect the auxiliary motor drive shaft 7-1 and Stirling engine drive shaft 2-8. This mechanism provides a way by which the Stirling engine draft shaft 2-8 can start rotation from a stationary state.

FIGS. 13A-13D show a sequence of four operations by the two engage-disengage mechanisms.

Initially, the heat transfer fluid needs to be circulated when the sunrays are focused to the absorber 11 and the rotary pump 5 will continue to circulate the HTF as long as the sun generates enough heat for the hot zone of Stirling engines. When the solar collector 2 starts to focus sunrays to the absorber 11, the system uses auxiliary starter motor 7 to initially start the rotation of the stacked Stirling engines drive shaft 2-8 to which rotary pump 5 is coupled.

FIG. 13A shows the disengagement position for all driving shafts during the nighttime so the wind turbine rotates and the hybrid system generates electricity solely from wind. When the sun rises and the HTF temperature reaches a set temperature (e.g., 100 Celsius), the engage-disengage motor 8 is activated (e.g., by thermocouple) to retract and tighten one set of the V belt 4-4 on the pulleys 4-1, 4-2, 4-3. As shown in FIG. 13B, the drive shaft 7-1 of auxiliary starter motor 7 and jointed drive shaft 2-8 of HTF rotary pump 5, cooling rotary pump 6 and Stirling engines 2 are now connected.

Soon after the HTF temperature reaches another set temperature (e.g., 150 Celsius), the thermocouple shuts off the auxiliary motor and activates the engage-disengage motor 8, which extends and loosens one set of the V belt 4-4 on the pulleys 4-1, 4-2, 4-3. As a result, drive shaft 7-1 of auxiliary motor 7 and drive shaft 2-8 of Stirling engines 2 become disconnected.

Once the sunrays are strong and Stirling engines start to rotate forcefully, the connection with the auxiliary motor is off so the second engage-disengage motor 9 in turn will retract and tighten another set of the V belt 4-8 on the pulleys 4-5, 4-6, 4-7. The drive shaft 3-1 of wind turbine 3 and jointed drive shaft 2-8 of the stacked Stirling engines 2 will be connected so the driving force will be transferred from the stacked Stirling engines 2 to the wind turbine generator 4 as shown in FIG. 13C.

When sky is overcast or in the nighttime, the wind turbine will disengage with the Sirling engines to remove the weight load and mechanic friction of Stirling engine and the hybrid solar/wind system will again function solely as a wind turbine generator. The engage-disengage motor 9 extends and loosens another set of the V belt 4-8 on the pulleys 4-5, 4-6, 4-7 of drive shaft 3-1 of wind turbine 3 and drive shaft 2-8 of Stirling engines 2 as shown in FIG. 13D.

The complete sequence is carried out repeatedly as illustrated in FIG. 13A, FIG. 13B, FIG. 13C, FIG. 13D then back to FIG. 13A and so on and so forth. In some examples, all six pulleys have large flanges 4-9 to hold the v-shaped belt in the grooves when the belt is in loose (disengage) and slack as shown in the figures.

6 Fluid Circulation Mechanism

Figure 14A:
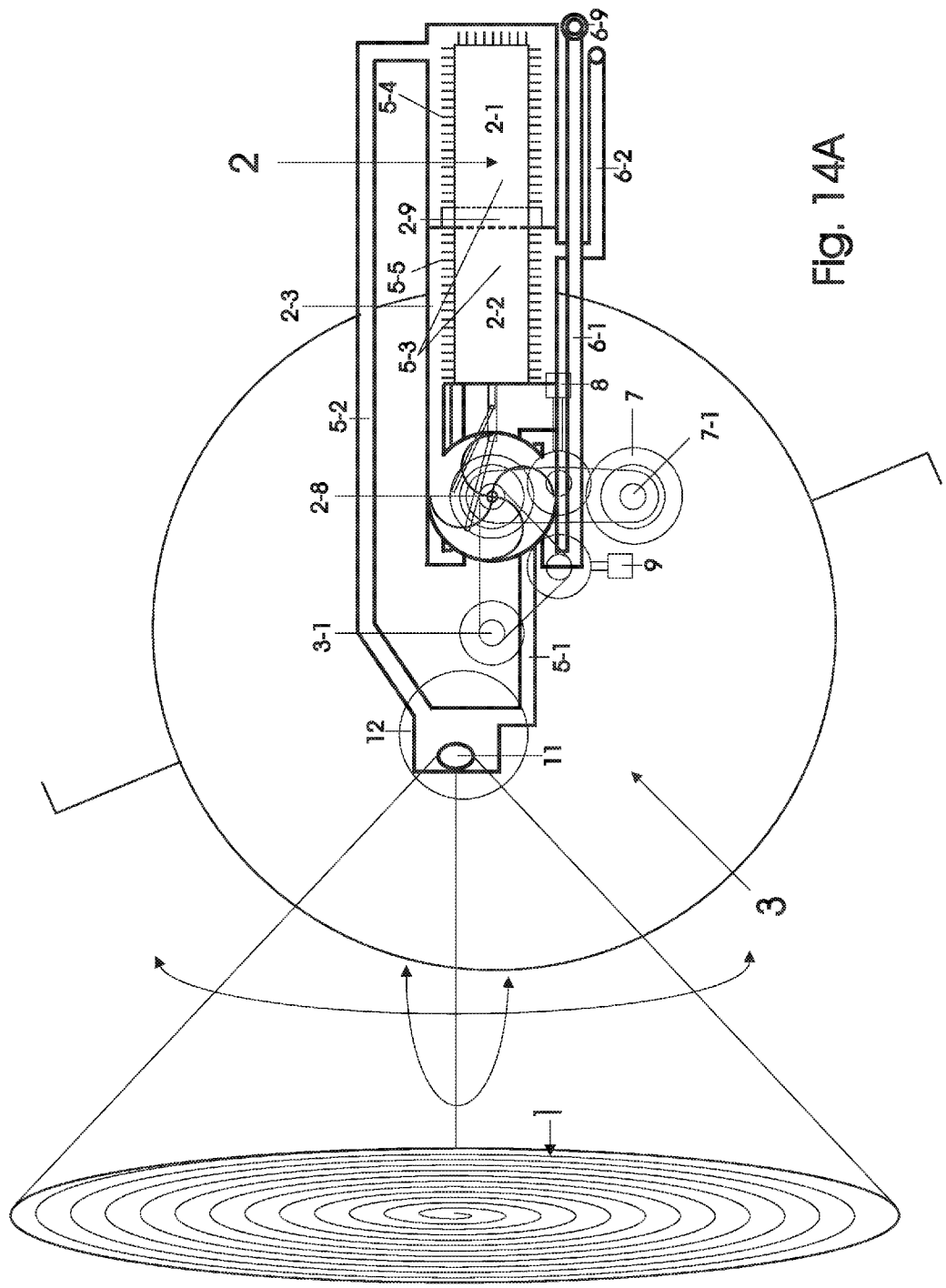
FIG. 14A shows a top view of a hybrid system having a solar collector, a wind turbine, Stirling engines, and two circulation systems.
Figure 14B:
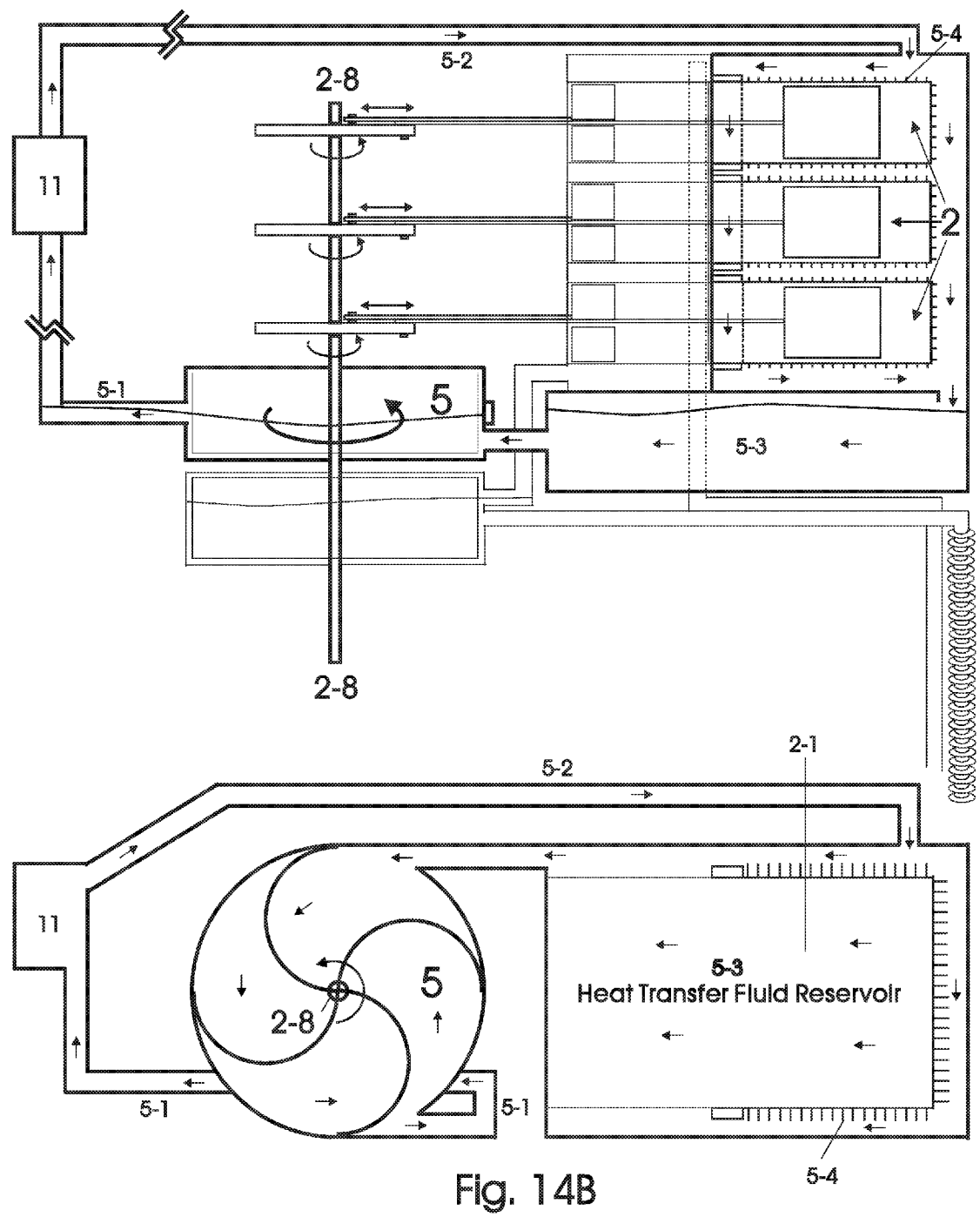
FIG. 14B shows a top and a side view of a heat transfer fluid closed cycle circulation system of FIG. 14A.
Figure 14C:
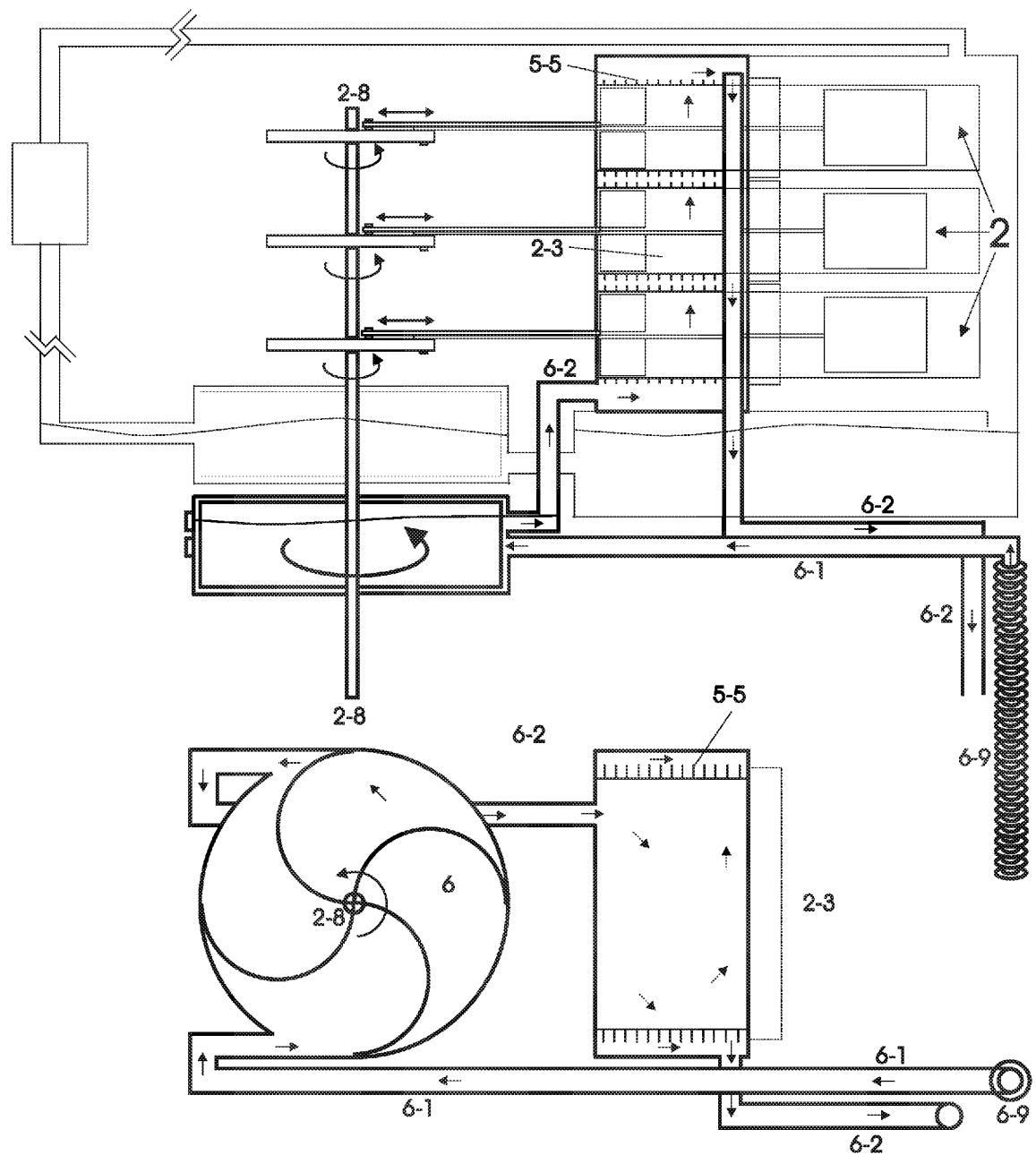
FIG. 14C shows a top and a side view of a cooling agent semi-closed cycle circulation system of FIG. 14A.

Now referring to FIGS. 14A-14C, on a sunny day, the heat transfer fluid is heated (e.g., up to 400 Celsius) in absorber 11 of the solar collector 1 and the high heated HTF passes a downstream conduit 5-2 that connects to the hot zone 2-1 of the multiple Stirling engines set 2. After heat exchange happens inside the multiple stacked Stirling engines, the heat transfer fluid is pumped through an upstream conduit 5-1 back to the absorber 11 to complete a closed heating cycle as indicated in FIG. 14A. The high heat (e.g., up to 400 Celsius) passes through the absorbing heat sink 5-4 in the hot zone of series of the Stirling engines in turn with stepping down heat exchange rate thus the Stirling engines can fully utilize the heat to maximize the output of power. The rotary pump 5, conduits 5-1, 5-2, the heat transfer fluid reservoir tank 5-3 and the heating cycle system are double sealed and insulated to reduce the heat loss and to enhance the efficiency of the Stirling engines. The heat transfer fluid closed cycle circulation systems including rotary pump 5, conduits 5-1, 5-2, the heat transfer fluid reservoir 5-3 that is located under the multiple Stirling engines 2 and a radiator type heat sink 5-4 of the hot zone 2-1 of the Stirling engines as shown in FIG. 14B. Another circulation systems for cooling agent semi-closed cycle that includes rotary pump 6, conduits 6-1, 6-2, the water jacket 2-3 surrounds the cold zone 2-2 of the multiple Stirling engines, a radiator type heat sink 5-5 of the cold zone 2-2 of the Stirling engines and a radiator type heat sink 6-9 (e.g., metal device with many fins) of the cooling agent upstream conduit 6-1 as shown in FIG. 14C.

Figure 15:
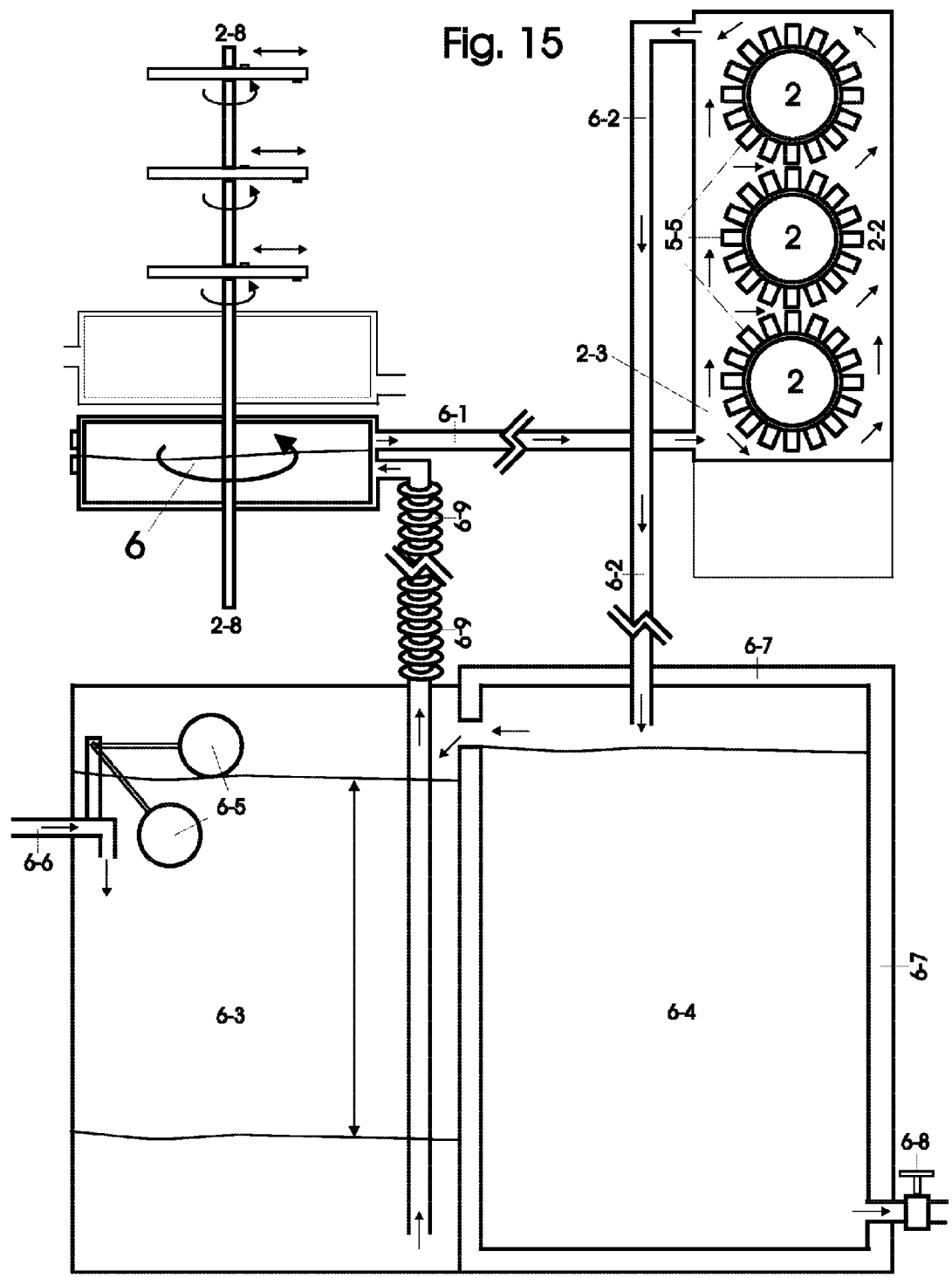
FIG. 15 is a detailed schematic diagram of the cooling agent circulation system of FIG. 14C.

Referring to FIG. 15, in this example, the water jacket 2-3 surrounding the cold zone 2-2 of the multiple Stirling engines 2 includes a radiator type heat sink cooling system 5-5 with fins or other means of increasing the surface area that covers the cold zone 2-2 of the stacked Stirling engines. The radiator heat sink 5-5 transfers the heat to the cooling agent inside the water jacket 2-3 and the ambient air outside. Rotary water pump 6 circulates the cooling water from cold water reservoir 6-3 through cold water conduit 6-1 into the water jacket 2-3 of the multiple Stirling engines wherein cooling down the cold zone 2-2 of the multiple Stirling engines by heat exchange with the thermal energy within hot zone 2-1. The heated coolant (e.g., water) is returned to the hot water reservoir 6-4 through hot water conduit 6-2.

The reservoir tanks of the cooling system include cold tank 6-3 and hot tanks 6-4 that are connected on the top portion. The hot tank 6-4 is connected to the hot water pipeline that runs into the building and cold tank 6-3 is connected with water supply line 6-6 to replenish the cold water. As the hot water is used through the hot water valve 6-8 to the building, the water from hot tank won't be able to feed back into the cold tank 6-3 through the connected pipeline. The water float 6-5 will activate the water supply 6-6 line to replenish the cold water, which can greatly reduce the temperature of the cold tank 6-3 and to further enhance the cooling process that increase the power efficiency of the Stirling engines.

Note that the cold zone temperature is important parameter that influences efficiency gains. For example, a change of 10 Celsius at the cold zone can have an equivalent effect on the ideal cycle efficiency of a change of 30 Celsius at the hot zone. To mitigate this effect, a radiator type heat sink 6-9 (e.g., metal device with many fins) is provided to cover the cooling agent upstream conduit and runs parallel with the wind rotors axis 3-1. The wind flow improve the transfer of thermal energy from the heat sink 6-9 to the air by moving cooler air between the fins so that the efficient heat dissipation is promptly obtained. The high heat circulating in the solar absorber, hot zone 2-1 of multiple Stirling engines 2, upstream conduit 5-1 and downstream conduit 5-2 is maintained by the insulation 6-7 such as a fiberglass felt to retain the heat and enhance the efficiency of the stacked Stirling engines.

7 Extensions and Applications

There can be many applications in which the systems and methods described above can be useful. For instance, in addition to producing electricity, the hybrid system (or some parts of the hybrid system) can also convert solar energy to thermal energy to furnish hot water supply and space heating for offices or residences.

Various types of solar collectors may be deployed in the hybrid system.

Figure 16:
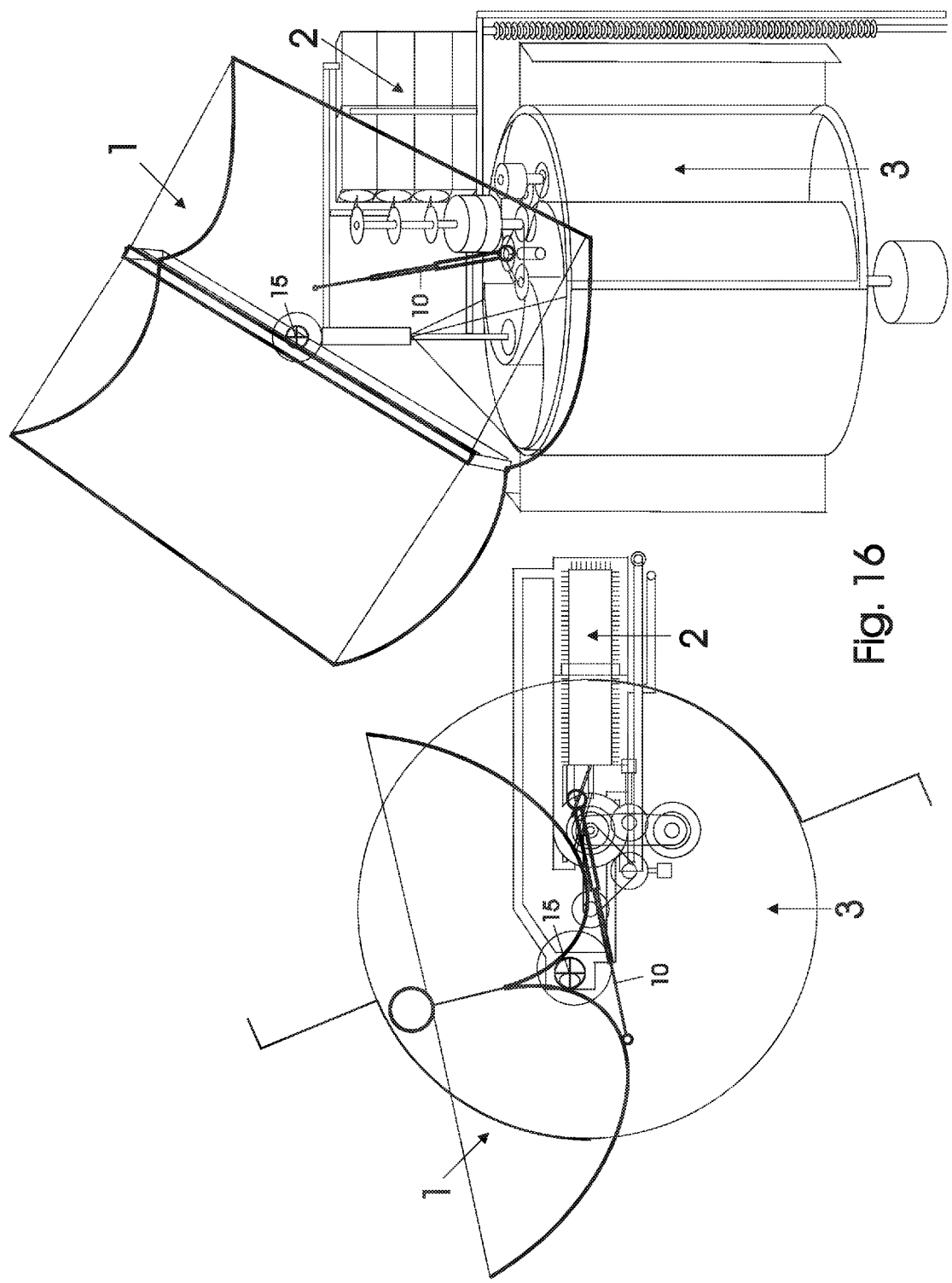
FIG. 16 shows a top and a perspective view of a hybrid system incorporates having a compound parabolic collector (CPC) with real time clock controller and linear actuator arm to move the compound parabolic trough array toward the sun movement of Azimuth and a manual or automated adjustment to optimal position for each season.

Referring to FIG. 16, for instance, a compound parabolic collector (CPC) trough permits much wider sunrays receiving angle and efficient collection without using sun tracker 12. It includes a set of inexpensive real time clock controllers that are connected with a linear actuator arm 10 to move the compound parabolic trough array toward the sun movement of Azimuth. The CPC is set up to have one axis aligned to be roughly parallel to the axis of rotation of the earth around the north and south poles. It also includes a manual adjustment 15 (monthly or bi-monthly) along a second axis: the angle of declination. The sun's declination at the spring equinox is 0°. It moves up to 22.5° in the summer then drifts back down through 0° at fall equinox and down to −22.5° in the winter. The second axis adjustment will orient the compound parabolic troughs array to face the sun when it is higher in the sky (and further northward) in the summer, and to face it lower in the sky (and further southward) in the winter for the optimal position for each season as shown in FIG. 16. Therefore, this solar collector does not require sophisticated and expensive two-axis heliostat 12 (e.g., sun-tracker), which can be prone to misalignment due to cloud interference.

Figure 17G:
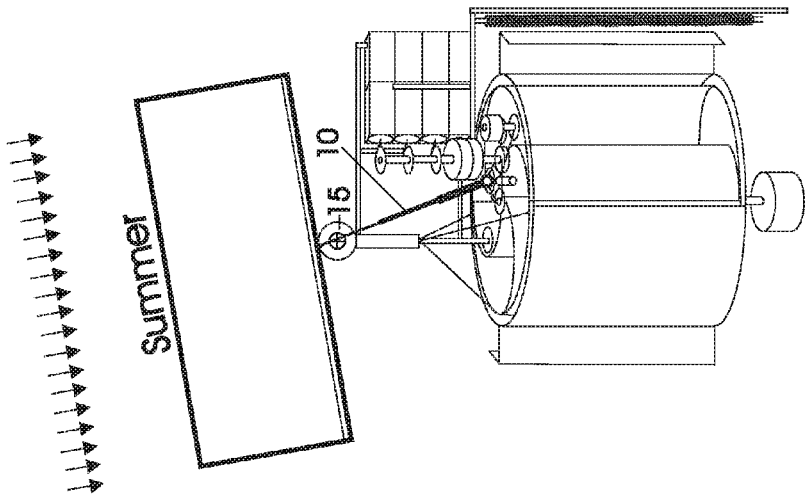
FIGS. 17A-D show sequential movements of Azimuth from sunrise to sunset.
FIGS. 17 E-G show sequential movements of the CPC of the hybrid system of FIG. 16 based on seasonal changes.
Figure 17F:
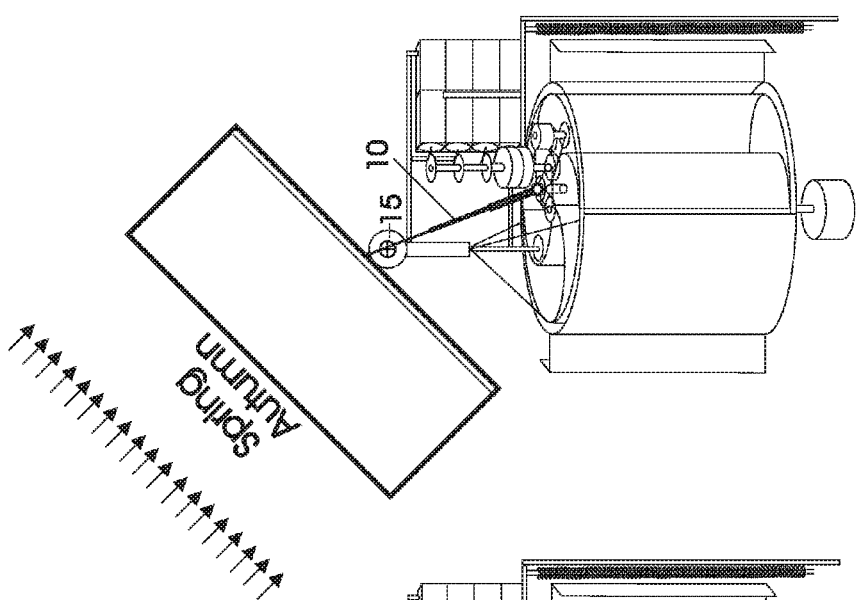
Figure 17E:
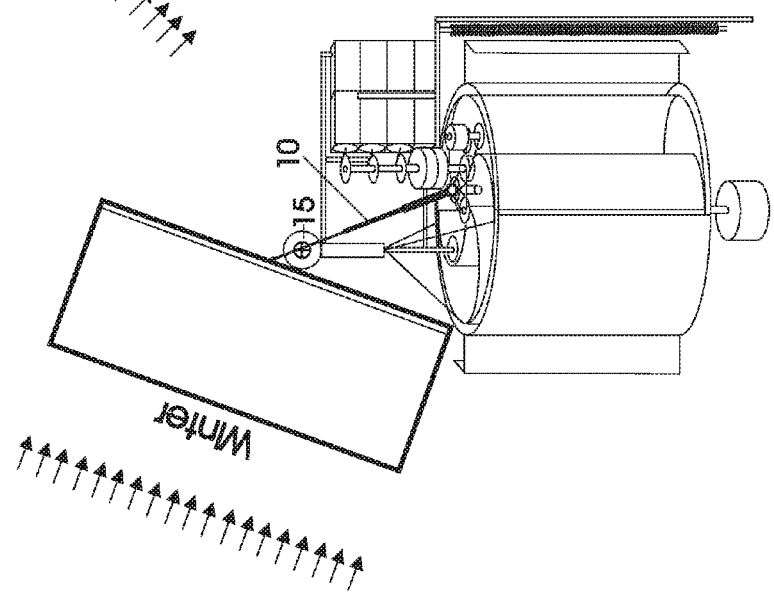

FIGS. 17A-17D show a top view of CPC hybrid solar and wind systems that illustrates the sequential movements of Azimuth from sunrise to sunset. The linear actuator arm 10 moves the CPC around the axis of the supporting column. The sequential movements along a second axis: the angle of declination for the optimal position for each season using a manual 15 or automated adjustment is shown in FIGS. 17E-17G. The manual adjustment mechanism includes turning wheel, connecting rod and gears that swing around the axis perpendicular to the axis of the supporting column. The automated adjustment needs additional electric motor and real time controller.

Figure 18:
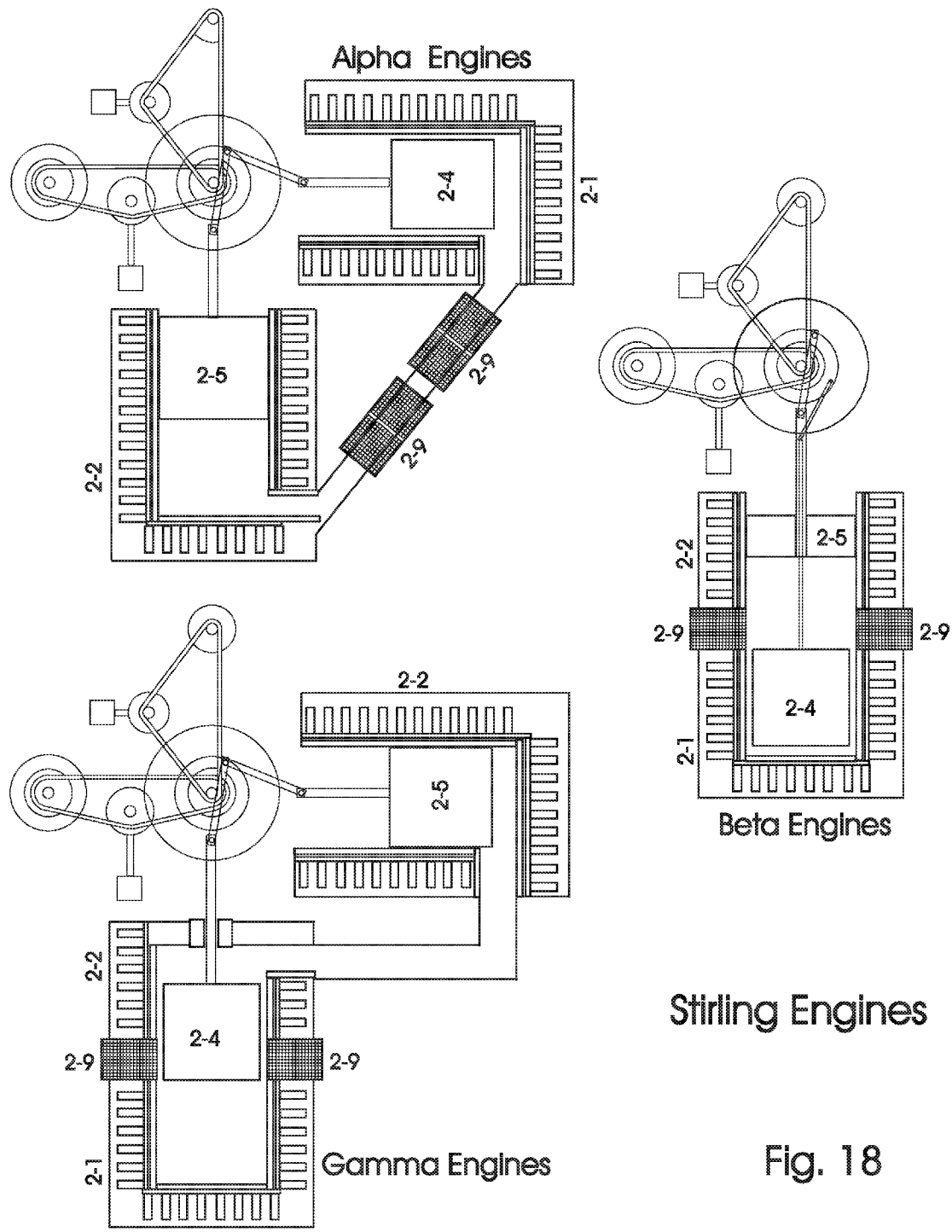
FIG. 18 shows various types of Stirling engine layouts, including an Alpha engine, a Beta engine, and a Gamma engine.

FIG. 18 shows examples of three types of Stirling engines that can be used in the hybrid systems, including Alpha engines, Beta engines and Gamma engines. These engines are distinguished by the way that they move the air between the hot and cold zones of the cylinder. Other types of Stirling engines or thermo-mechanical engines can also be used.

Figure 19:
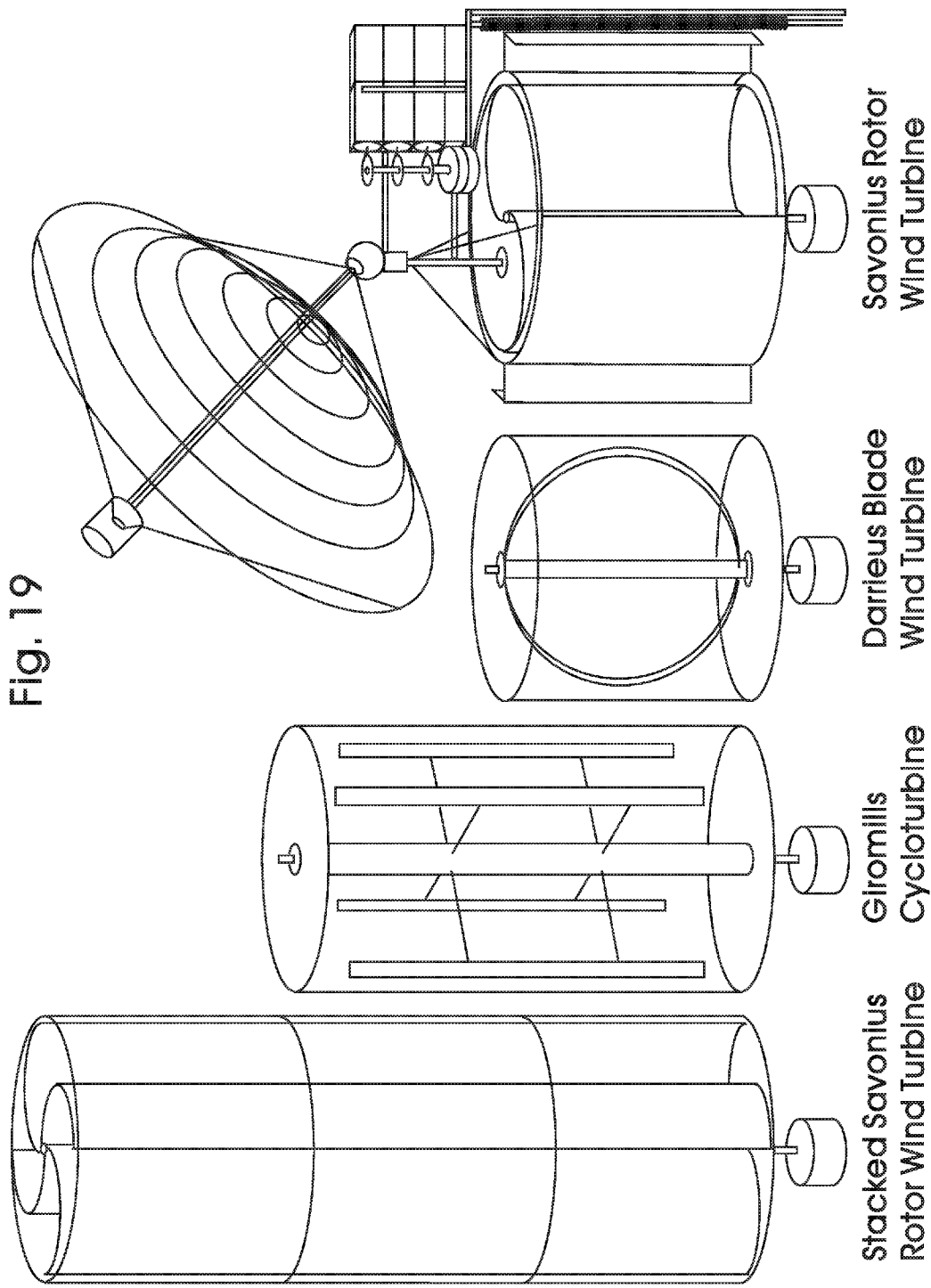
FIG. 19 shows various types of wind turbine embodiments, including a Darrieus type turbine, two Savonius type turbines, and a Giromills Cycloturbine.

FIG. 19 shows examples of various types of vertical axis wind turbines that can be used in the hybrid systems, including Darrieus blade type turbine, Savonius blade type turbine, Giromills Cycloturbine, and others. Other types of wind turbines can also be used.

FIG. 20 shows a set of solar panels 14 that can be used to generate electrical currents independently from the solar and wind collectors. The generated currents can be combined via electrical coupling as shown in the figure. The solar panels 14 can utilize the sun tracking function and generate the extra electricity to power the electric requirements of the said system.

In some implementations, solar collectors are made of high strength, durable, non-corrosive, shock absorbent, vibration dampening and lightweight advanced composite (glass fiber and carbon fiber) structures. Also, advanced composite (carbon fiber and Kevlar fiber) airfoils, blades or vanes are used in the wind turbine to generate electricity. The hybrid system can achieve and maintain high operational efficiencies with light weight and substantially reduced manufacturing and maintenance cost. In addition, because of the structure simplicity of construction and light weighted with composites, it can be affordable for small commercial office building rooftop, parking lot and house rooftop or backyard electricity generating application. Furthermore, the system can be used to meet household/small business energy demands in both urban and suburban areas at a cost affordable even by developing countries.

It is to be understood that the foregoing description is intended to illustrate and not to limit the scope of the invention, which is defined by the scope of the appended claims. Other embodiments are within the scope of the following claims.

The invention claimed is:
1. A system for converting wind and solar energy for use with an electrical generator, the system comprising:
   a wind powered subsystem including:
      a rotor for receiving wind to generate mechanical energy; and
      a first shaft for providing a permanent mechanical coupling between the rotor and the electrical generator for transferring the generated mechanical energy to the electrical generator;

a solar powered subsystem including:
  a solar collector for receiving solar energy to generate thermal energy;
  a thermo-mechanical engine coupled to the solar collector for converting the generated thermal energy into mechanical energy; and
  a second shaft mechanically coupled to the thermo-mechanical engine; and
an interconnection subsystem for selecting between coupling the second shaft to the first shaft for combining the mechanical energy generated by the wind and solar powered subsystems to be transferred to the electrical generator, and decoupling the second shaft from the first shaft.

2. The system of claim 1, wherein the thermo-mechanical engine of the solar powered subsystem includes an external combustion engine.

3. The system of claim 2, wherein the external combustion engine includes a Stirling engine.

4. The system of claim 1, wherein the solar collector includes a parabolic trough.

5. The system of claim 1, wherein the wind powered subsystem further includes a windshield-deflector structure rotatably mounted to the first shaft.

6. The system of claim 5, wherein the windshield-deflector structure includes
  a first arc-cylindrical member positioned adjacent to a periphery of said rotor; and
  a second arc-cylindrical member positioned adjacent to a periphery of said rotor diametrically opposite from said first arc-cylindrical member.

7. The system of claim 6, wherein the windshield-deflector structure further includes:
  a first deflector angle-mounted at an outer edge of the first arc-cylindrical member, said first deflector having a bend at an outside edge thereof, said bend pointing in a first direction;
  a second deflector angle-mounted at an outer edge of the second arc-cylindrical member, said first deflector having a bend at an outside edge thereof, said bend pointing in a second direction opposite said first direction;
  wherein said first and second deflectors cooperate to direct wind flow toward a desired region of the rotor and to selectively expose different portions of said rotor in response to changes in wind direction.

8. The system of claim 1, wherein the interconnection subsystem includes a set of pulleys and one or more V-belts for selectively coupling the set of pulleys.

9. The system of claim 8, further comprising a control module for generating the control signal for causing movement for controlling said interconnection system in response to environmental conditions.

10. The system of claim 9, wherein the environmental conditions include a wind condition.

11. The system of claim 9, wherein the environmental conditions include a sun condition.

12. The system of claim 9, wherein the environmental conditions include a temperature condition.

13. The system of claim 9, wherein the control module includes a temperature sensor.

14. The system of claim 1, wherein the solar powered subsystem includes circulation systems for respectively circulating heat transfer fluid through a hot zone and cooling agent through a cold zone of the thermo-mechanical engine.

15. The system of claim 14, wherein the circulation system includes
  a thermo insulated closed loop circulation system
  a fluid reservoir for containing the heat transfer fluid, and
  a rotary pump driven by the thermo-mechanical engine for pumping the heat transfer fluid contained in the fluid reservoir through a first conduit toward a heat source to be heated and subsequently through a second conduit toward the hot zone of the thermo-mechanical engine, said rotary pump being configured to pump the heat transfer fluid in response to solar radiation.

16. The system of claim 1, wherein the solar powered subsystem further includes a second circulation system driven by the thermo-mechanical engine for circulating cooling agent to maintain a low temperature of the cold zone of the thermo-mechanical engine, said second circulation system being configured to circulate cooling agent in response to solar radiation.

17. The system of claim 1, wherein the solar powered subsystem further includes a sun tracking component for obtaining measurements of the sun's rays and for directing the solar collector to a desired orientation relative to the sun's rays based on the obtained measurements.

18. The system of claim 1, wherein the wind powered subsystem includes a horizontal-axis turbine.

19. The system of claim 1, wherein the wind powered subsystem includes a vertical-axis turbine.

20. The system of claim 1, wherein the solar collector includes a parabolic dish.

21. The system of claim 1, wherein the solar collector includes a Fresnel lens.

22. The system of claim 1, wherein the solar collector includes an evacuated solar tube.

* * * * *

Disclaimer

7,964,981 B2—Jason Tsao, Torrence, CA (US). SOLAR AND WIND ENERGY CONVERTER. Patent dated June 21, 2011. Disclaimer filed April 5, 2011, by the owner.

The term of this patent shall not extend beyond the expiration date of patent no. 7,964,981.

*(Official Gazette January 10, 2012)*